(12) United States Patent
Vineyard et al.

(10) Patent No.: US 9,005,454 B2
(45) Date of Patent: *Apr. 14, 2015

(54) METHODS AND COMPOSITIONS FOR TREATING WATER-CONTAINING SYSTEMS

(71) Applicant: Blue Earth Labs, LLC, Las Vegas, NV (US)

(72) Inventors: Douglas R. Vineyard, Kimberling City, MO (US); Eric W. Christensen, Las Vegas, NV (US); Jason Peters, Shawnee, KS (US)

(73) Assignee: Blue Earth Labs, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/011,261

(22) Filed: Aug. 27, 2013

(65) Prior Publication Data

US 2014/0054239 A1    Feb. 27, 2014

Related U.S. Application Data

(63) Continuation of application No. 13/755,850, filed on Jan. 31, 2013, now Pat. No. 8,518,270, which is a continuation of application No. 12/763,207, filed on Apr. 19, 2010, now Pat. No. 8,366,939, which is a (Continued)

(51) Int. Cl.
   *C02F 1/46*     (2006.01)
   *C02F 1/68*     (2006.01)
   (Continued)

(52) U.S. Cl.
   CPC ............... *C02F 1/72* (2013.01); *C02F 1/008* (2013.01); *C02F 1/4674* (2013.01); *C02F 1/686* (2013.01); *C02F 1/76* (2013.01); *C02F 2209/001* (2013.01)

(58) Field of Classification Search
   CPC ............... C02F 1/50; C02F 1/68; C02F 1/76; C02F 5/00; C02F 1/008; C02F 1/686; C02F 1/72; C02F 1/4674; C02F 2103/02; C02F 2303/22; C02F 2209/001
   USPC ........................ 210/748.2, 756, 764
   See application file for complete search history.

(56) References Cited

U.S. PATENT DOCUMENTS

| 4,139,449 | A | 2/1979 | Goto et al. |
| 4,240,884 | A | 12/1980 | Pellegri |

(Continued)

FOREIGN PATENT DOCUMENTS

| CA | 1 263 095 A1 | 11/1989 |
| CA | 2267265 A1 | 4/1998 |

(Continued)

OTHER PUBLICATIONS

Response to Office Action filed Nov. 17, 2004 in U.S. Appl. No. 78/325,434 (RE-Ox) with specimen label, identifying date of first use as Nov. 2003.

(Continued)

*Primary Examiner* — Lucas Stelling
(74) *Attorney, Agent, or Firm* — Vincent K. Gustafson; Withrow & Terranova, PLLC

(57) ABSTRACT

Methods and compositions for improving water quality by reducing chlorine demand, decreasing disinfection by-products and controlling deposits in water systems include adding low concentrations of supplemental oxidants, for example, RE-Ox® to the systems.

21 Claims, 25 Drawing Sheets

Related U.S. Application Data continuation of application No. 11/973,872, filed on Oct. 9, 2007, now abandoned.

(60) Provisional application No. 60/828,879, filed on Oct. 10, 2006.

(51) Int. Cl.

| | | |
|---|---|---|
| C02F 1/72 | (2006.01) | |
| C02F 1/76 | (2006.01) | |
| C02F 1/00 | (2006.01) | |
| C02F 1/467 | (2006.01) | |

(56) References Cited

U.S. PATENT DOCUMENTS

| | | | |
|---|---|---|---|
| 4,308,117 A | | 12/1981 | Sweeney |
| 4,329,215 A | | 5/1982 | Scoville |
| 4,411,759 A | | 10/1983 | Olivier |
| 4,545,863 A | | 10/1985 | Yeager et al. |
| 4,585,539 A | | 4/1986 | Edson |
| 4,686,018 A | | 8/1987 | Chaussard |
| 4,693,806 A | | 9/1987 | Tucker |
| 4,761,208 A | | 8/1988 | Gram et al. |
| 4,767,511 A | | 8/1988 | Aragon |
| 4,786,380 A | | 11/1988 | Van Duin et al. |
| 5,037,519 A | | 8/1991 | Wiscombe |
| 5,082,543 A | | 1/1992 | Gnann et al. |
| 5,124,017 A | | 6/1992 | Rogov et al. |
| 5,314,629 A | | 5/1994 | Griese et al. |
| 5,316,740 A | | 5/1994 | Baker et al. |
| 5,405,507 A | | 4/1995 | Bishara et al. |
| 5,424,032 A | * | 6/1995 | Christensen et al. ............ 422/14 |
| 5,427,667 A | | 6/1995 | Bakhir et al. |
| 5,540,819 A | | 7/1996 | Bakhir et al. |
| 5,624,544 A | | 4/1997 | Deguchi et al. |
| 5,628,888 A | | 5/1997 | Bakhir et al. |
| 5,635,040 A | | 6/1997 | Bakhir et al. |
| 5,693,212 A | | 12/1997 | Mazanec et al. |
| 5,783,052 A | | 7/1998 | Bakhir et al. |
| 5,858,201 A | | 1/1999 | Otsuka et al. |
| 5,871,623 A | | 2/1999 | Bakhir et al. |
| 5,932,171 A | | 8/1999 | Malchesky |
| 5,938,916 A | | 8/1999 | Bryson et al. |
| 5,958,229 A | | 9/1999 | Filiopoulos et al. |
| 5,985,110 A | | 11/1999 | Bakhir et al. |
| 6,004,439 A | | 12/1999 | Bakhir et al. |
| 6,033,539 A | | 3/2000 | Gablenko |
| 6,059,941 A | | 5/2000 | Bryson et al. |
| 6,063,247 A | | 5/2000 | Bergmann et al. |
| 6,217,741 B1 | | 4/2001 | Doi |
| 6,296,744 B1 | | 10/2001 | Djeiranishvili et al. |
| 6,319,390 B1 | * | 11/2001 | Kono et al. ................... 205/701 |
| 6,528,214 B1 | | 3/2003 | Pliner et al. |
| 6,558,537 B1 | | 5/2003 | Herrington et al. |
| 6,623,695 B2 | | 9/2003 | Malchesky et al. |
| 6,632,347 B1 | | 10/2003 | Buckley et al. |
| 6,752,757 B2 | | 6/2004 | Muir et al. |
| 6,805,787 B2 | | 10/2004 | Bess et al. |
| 6,811,710 B2 | | 11/2004 | Simmons |
| 6,843,895 B2 | | 1/2005 | Bakir et al. |
| 6,860,976 B2 | | 3/2005 | Andrews et al. |
| 7,090,753 B2 | | 8/2006 | Sumita |
| 7,276,255 B2 | | 10/2007 | Selkon |
| 7,303,660 B2 | | 12/2007 | Buckley et al. |
| 7,326,330 B2 | | 2/2008 | Herrington et al. |
| 7,374,645 B2 | | 5/2008 | Davis et al. |
| 7,691,249 B2 | | 4/2010 | Daly et al. |
| 7,828,942 B2 | | 11/2010 | Cocking |
| 7,897,023 B2 | | 3/2011 | Bakhir et al. |
| 7,922,890 B2 | | 4/2011 | Sanchez et al. |
| 8,366,939 B2 | | 2/2013 | Vineyard et al. |
| 8,518,270 B1 | | 8/2013 | Vineyard et al. |
| 2001/0022273 A1 | | 9/2001 | Popov et al. |
| 2002/0182262 A1 | | 12/2002 | Selkon |
| 2002/0189954 A1 | * | 12/2002 | Miyazaki et al. ............. 205/742 |
| 2003/0133878 A1 | | 7/2003 | Hinze |
| 2004/0055896 A1 | | 3/2004 | Anderson et al. |
| 2005/0029093 A1 | | 2/2005 | Rawhani et al. |
| 2005/0121334 A1 | | 6/2005 | Sumita |
| 2006/0049118 A1 | | 3/2006 | Robles |
| 2006/0124453 A1 | | 6/2006 | Cross |
| 2006/0249375 A1 | | 11/2006 | Aoun et al. |
| 2006/0278585 A1 | | 12/2006 | Cocking |
| 2007/0007145 A1 | * | 1/2007 | Simmons et al. ............. 205/357 |
| 2007/0017820 A1 | | 1/2007 | Anderson et al. |
| 2007/0051640 A1 | | 3/2007 | Bellamy |
| 2007/0108064 A1 | | 5/2007 | Buckley et al. |
| 2008/0116144 A1 | | 5/2008 | Vineyard et al. |

FOREIGN PATENT DOCUMENTS

| | | |
|---|---|---|
| EP | 0201951 B1 | 5/1990 |
| JP | 01-104387 A | 4/1989 |
| WO | WO-2007/057940 A1 | 5/2007 |

OTHER PUBLICATIONS

Dreeszen, P. "The key to understanding and controlling bacterial growth in Automated Drinking Water Systems, Second Ed." Jun. 2003, Edstrom Industries, Inc.

Dandoy et al. "Disinfection of Water systems" 1978, Arizona Division of Environmental Health Services, Bureau of Water Quality Control.

"Lectranator II: Commercial Operation / Installation Manual" Lectranator Systems, Inc., 2003.

Bergsrud et al. "Treatment Systems for Household Water Supplies: Chlorination," 1992, North Dakota State University.

"AWS Technical Report: Sanitizing Pipelines & Distribution Systems by Shock-Chlorination," 2003, AWS, Inc.

Bard, et al. "Electrochemical Methods: Fundamentals and Applications" 1980, John Wiley & Sons, Inc. pp. 14-16

Supplementary European Search Report issued on Sep. 17, 2010 in European Patent Application No. 07 844 107.8.

Advisory Action issued on Apr. 8, 2010 in U.S. Appl. No. 11/973,872.

Final Office Action issued on Dec. 17, 2009 in U.S. Appl. No. 11/973,872.

International Search Report issued in International Patent Applicaton No. PCT/US07/80974 dated May 6, 2008.

Letter from Douglas R. Vineyard filed in U.S. Patent No. 8,366,939 on Jul. 5, 2013.

CL Marketing Inc., "Lectranator® Domestic Chlorine Generating Device, Installation / Operation Manual for All SRT Models", Jun. 2005, 19 pages.

Author Unknown, "Oxcide," Greenhouse Brochure, 2005, CFI Chem Fresh, Inc., www.chemfresh.com/pages/GreenHouseOnlyEmail.pdf, 12 pages.

Cloete, Thomas E. et al., "The Antimicrobial Mechanism of Electrochemically Activated Water Against *Pseudomonas aeruginosa* and *Escherichia coli* as Determined by SDS-PAGE Analysis," Journal of Applied Microbiology, vol. 107, Issue 2, Aug. 2009, The Society for Applied Microbiology, pp. 379-384.

Cloete, Thomas E., "Electrochemically Activated Water as Non-Polluting Anti-Fouling Technology," Paper 02463, presented at Corrosion 2002, Apr. 7-11, 2002, Denver, Colorado, NACE International, 7 pages.

Riekel, T. et al., "World Spotlight: Electrolytically Active Water—Using Chemical-Free Technology to Clean Up Wells in Botswana," Water Conditioning and Purification Magazine, vol. 44, No. 11, Nov. 2002, EIJ Company, LLC, 3 pages.

* cited by examiner

| | Total Chlorine Samples | | | | | | | | | | | | | | |
|---|---|---|---|---|---|---|---|---|---|---|---|---|---|---|---|
| | Sampling Site | | | | | | | | | | | | | | |
| | 1 | 2 | 3 | 4 | 5 | 6 | 7 | 8 | 9 | 10 | 11 | 12 | 13 | 14 | 15 |
| BEFORE (10 Mo. Avg.) | 2.4 | 2.5 | 2.8 | 2.3 | 2.6 | 2.7 | 2.0 | 2.2 | 2.6 | 2.6 | 2.6 | 2.4 | 1.8 | 1.5 | 1.6 |
| Burnout | 2.1 | 3.7 | 5.4 | 0.6 | 4.6 | 2.1 | 5.2 | 5.8 | 5.8 | 5.8 | 5.7 | 5.8 | 4.5 | 3.8 | 3.3 |
| AFTER (2 Mo. Avg.) | 3.6 | 2.9 | 2.9 | 2.9 | 2.9 | 3.3 | 3.2 | 3.2 | 3.2 | 3.3 | 3.2 | 3.4 | 3.4 | 2.6 | 3.2 |
| | Sampling Site | | | | | | | | | | | | | | |
| | 16 | 17 | 18 | 19 | 20 | 21 | 22 | 23 | 24 | 25 | 26 | 27 | 28 | 29 | |
| BEFORE (10 Mo. Avg.) | 1.9 | 1.5 | 1.8 | 1.7 | 1.3 | 1.0 | 1.8 | 2.2 | 2.3 | 2.2 | 1.5 | 1.3 | 2.1 | 1.7 | |
| Burnout | 4.8 | 3.7 | 4.7 | 2.2 | 3.2 | 2.3 | 3.3 | 5.1 | 5.9 | 1.9 | 5.4 | 5.3 | 5.4 | 5.2 | |
| AFTER (2 Mo. Avg.) | 3.4 | 3.4 | 3.4 | 3.0 | 2.8 | 2.4 | 1.9 | 2.3 | 2.8 | 2.6 | 2.6 | 2.3 | 2.8 | 2.5 | |

*FIG. 22*

TABLE 1

Chlorinated Water BEFORE RE-Ox ® Treatment Averages
of 17 Samples Taken from Each Sampling Point Location
(During about a 3 month period)

| Sampling Point # | TDS | ORP | Free Available Cl2 |
|---|---|---|---|
| Harper Well (1) | 395 | 658 | 1.63 |
| Moran Well (5) | 424 | 680 | 1.81 |
| 2 | 398 | 623 | 1.20 |
| 3 | 428 | 607 | 1.27 |
| 4 | 441 | 663 | 1.33 |
| 6 | 442 | 648 | 1.35 |
| 7 | 422 | 527 | 0.66 |
| 8 | 446 | 643 | 1.22 |
| 9 (dead end) | 475 | 427 | 0.26 |
| 10 | 426 | 641 | 1.37 |
| Distribution System Average* | 435 | 597 | 1.08 |

*Samples taken from wells not included in Distribution System averages.

FIG. 23

TABLE 2

Chlorinated Water AFTER RE-Ox ® Treatment Averages
of 8 Samples Taken from Each Sampling Point Location
(During about a 3 month period)

| Sampling Point # | TDS | ORP | Free Available Cl2 |
|---|---|---|---|
| Harper Well (1) | 440 | 671 | 1.52 |
| Moran Well (5) | 448 | 667 | 1.73 |
| 2 | 430 | 648 | 0.86 |
| 3 (revised location) | 445 | 717 | 1.73 |
| 4 | 449 | 705 | 1.48 |
| 6 (revised location) | 449 | 704 | 1.40 |
| 7 (revised location) | 448 | 672 | 1.35 |
| 8 | 449 | 679 | 1.34 |
| 9 (dead end, revised location) | 469 | 610 | 0.47 |
| 10 | 441 | 683 | 1.33 |
| 11 (new location) | 443 | 675 | 1.16 |
| 12 (new location) | 442 | 665 | 0.86 |
| 13 (new location) | 440 | 675 | 1.07 |
| 14 (new location) | 440 | 688 | 1.25 |
| Distribution System Average* | 445 | 677 | 1.19 |

*Samples taken from wells not included in Distribution System averages.

FIG. 24

TABLE 3

| Water | Cl₂ | ORP | pH | TDS | Turbidity* |
|---|---|---|---|---|---|
| Raw Water | 1.52 | 666 | 7.44 | 449 | 0.46 |
| RE-Ox ® Treated Water | 1.70 | 685 | 7.74 | 464 | 0.21 |
| Discharge Water | 1.64 | 730 | 7.32 | 463 | 1042 |

*data corresponding with incident at supply well not included in turbidity averages.

FIG. 25

TABLE 4

| Pipe # | Length of Section | Initial Weight Apr. 25, 2006 | Weight After 8 hrs presoaking | Reduction | Weight After 106 days Aug. 7, 2006 | Reduction |
|---|---|---|---|---|---|---|
| 1 | 16" | 6 lbs | 5 lbs | 1 lb - 17% | 3 lbs | 3 lbs - 50% |
| 2 | 38" | 18.5 lbs | | | 17 lbs | 1.5 lbs - 8% |
| 3 | 67.5" | 37 lbs | | | 33 lbs | 4 lbs - 11% |
| Totals | 121.5" | 61.5 lbs | | | 53 lbs | 8.5 lbs - 14% (= 136 ounces of removal, Or 1.2 ounces per day, Or 1.1 ounces per inch of pipe) |

FIG. 26

TABLE 5

| PILOT TEST METER AND TUBERCULATED 1" GALV. PIPE DATE: | COND | TDS | ORP | pH | TOTAL CL2 | FREE CL2 | TOTALGALS |
|---|---|---|---|---|---|---|---|
| CITY WATER | | | | | | | |
| Jan. 15, 2006 | 692 | 470 | 670 | 7.4 | 6.8 | 1.9 | 36 |
| Jan. 17, 2006 | 684 | 471 | 665 | 7.5 | 2.8 | 2.7 | 4980 |
| Jan. 18, 2006 | 735 | 506 | 491 | 7.7 | 1.9 | 1.1 | 6870 |
| Jan. 19, 2006 | 791 | 544 | 410 | 7.9 | 3.2 | 0.6 | 8630 |
| Jan. 30, 2006 | 805 | 553 | 262 | 7 | 1.93 | 0.2 | 25160 |
| Feb. 1, 2006 | 810 | 558 | 245 | 7.4 | 1.92 | 1.66 | |
| Feb. 3, 2006 | 801 | 552 | 254 | 7.3 | 2.3 | 1.38 | |
| Feb. 4, 2006 | 795 | 548 | 300 | 7.4 | 2 | 1.7 | |
| Feb. 6, 2006 | 804 | 556 | 247 | 7.26 | 1.13 | 0.06 | 32790 |
| Feb. 7, 2006 | 791 | 544 | 261 | 7.31 | 6.6 | 1.54 | 35150 |
| Feb. 8, 2006 | 791 | 546 | 275 | 7.34 | 2.2 | 0.12 | 37248 |
| Feb. 9, 2006 | 789 | 545 | 270 | 7.47 | 2.3 | 0.26 | 39440 |
| Feb. 10, 2006 | 790 | 545 | 273 | 7.51 | 2.12 | 0.16 | 41620 |
| Feb. 11, 2006 | 796 | 550 | 270 | 7.42 | 2.03 | 0.11 | 45050 |
| Feb. 13, 2006 | 795 | 551 | 241 | 7.64 | 1.94 | 0.05 | 47000 |
| Feb. 16, 2006 | 800 | 551 | 247 | 7.24 | 3.6 | 0.09 | 53710 |
| Feb. 17, 2006 | 792 | 547 | 275 | 7.35 | 3 | 0.06 | 56710 |
| Feb. 20, 2006 | 789 | 544 | 250 | 7.15 | 2.2 | 0.16 | 57124 |
| Feb. 21, 2006 | 795 | 550 | 255 | 7.6 | 3.6 | 0.13 | 59712 |
| Feb. 22, 2006 | 797 | 550 | 273 | 7.6 | 4.2 | 0.13 | 61971 |
| Feb. 24, 2006 | 792 | 545 | 284 | 7.68 | 3.3 | 0.88 | 66612 |
| Feb. 28, 2006 | 893 | 550 | 279 | 7.75 | 4.5 | 0.31 | 69750 |
| Mar. 1, 2006 | 795 | 548 | 282 | 7.53 | 3.6 | 0.15 | 71702 |
| Mar. 2, 2006 | 798 | 551 | 307 | 7.77 | 3.3 | 0.11 | 73941 |
| Mar. 3, 2006 | 797 | 551 | 265 | 7.82 | 3 | 0.2 | 75134 |
| Mar. 6, 2006 | 794 | 548 | 278 | 7.59 | 2.8 | 0.17 | 78465 |
| Mar. 7, 2006 | 798 | 550 | 285 | 7.74 | 2.9 | 0.24 | 80458 |
| Mar. 14, 2006 | 804 | 555 | 312 | 7.61 | 1.39 | 0.12 | 80500 |
| Mar. 15, 2006 | 807 | 556 | 364 | 7.56 | 2.04 | 0.48 | 81380 |
| Mar. 23, 2006 | 807 | 556 | 364 | 7.56 | 2.04 | 0.48 | 83763 |
| Mar. 24, 2006 | 800 | 552 | 482 | 7.46 | 4.2 | 0.83 | 84202 |
| Mar. 27, 2006 | 799 | 550 | 280 | 7.33 | 1.76 | 0.1 | 84260 |
| Mar. 31, 2006 | 796 | 548 | 276 | 7.51 | 2.14 | 0.42 | 85820 |
| Apr. 3, 2006 | 802 | 551 | 276 | 7.26 | 2.08 | 0.18 | 87030 |
| Apr. 5, 2006 | 801 | 550 | 285 | 7.45 | 1.9 | 0.1 | 87280 |
| Apr. 6, 2006 | 801 | 548 | 274 | 7.46 | 1.71 | 0.35 | 87690 |
| Apr. 7, 2006 | 783 | 537 | 326 | 7.52 | 2.17 | 0.1 | 70220 |
| Apr. 10, 2006 | 787 | 537 | 311 | 7.57 | 1.8 | 0.22 | 91307 |
| Apr. 12, 2006 | 775 | 530 | 307 | 7.99 | 1.81 | 0.09 | 92180 |
| Apr. 13, 2006 | 776 | 530 | 258 | 7.72 | 1.82 | 0.89 | 92743 |
| Apr. 21, 2006 | 758 | 518 | 452 | 7.52 | 2 | 0.26 | 95676 |
| Apr. 28, 2006 | 765 | 523 | 445 | 7.53 | 1.26 | 0.89 | 104257 |
| AVERAGE | 790 | 542 | 320 | 7.51 | 2.65 | 0.52 | |
| RE-Ox ® Treated Water After Test Assembly (Discharge Water) | | | | | | | |
| Jan. 15, 2006 | 750 | 514 | 730 | 7 | 3.2 | 0.94 | 36 |
| Jan. 17, 2006 | 818 | 565 | 480 | 7.7 | 4.2 | 2.2 | 4980 |
| Jan. 18, 2006 | 870 | 601 | 490 | 7.7 | 5.9 | 0.2 | 6870 |
| Jan. 19, 2006 | 880 | 607 | 268 | 7 | 6.7 | 4.9 | 8630 |
| Jan. 30, 2006 | 975 | 676 | 268 | 7 | 2.2 | 0.34 | 25160 |
| Feb. 1, 2006 | 1079 | 752 | 373 | 7.2 | 1.07 | 1.08 | |
| Feb. 3, 2006 | 940 | 652 | 317 | 7.3 | 3.8 | 0.28 | |
| Feb. 4, 2006 | 986 | 686 | 309 | 7.4 | 4.5 | 0.9 | |
| Feb. 6, 2006 | 892 | 618 | 289 | 7.2 | 1.21 | 0.13 | 32790 |
| Feb. 7, 2006 | 850 | 588 | 293 | 7.24 | 3.8 | 0.52 | 35150 |
| Feb. 8, 2006 | 836 | 578 | 307 | 7.38 | 5.2 | 2.3 | 37248 |
| Feb. 9, 2006 | 869 | 600 | 280 | 7.63 | 2.2 | 0.55 | 39440 |
| Feb. 10, 2006 | 845 | 584 | 314 | 7.48 | 4.8 | 0.31 | 41620 |
| Feb. 11, 2006 | 879 | 610 | 319 | 7.38 | 5.3 | 1.04 | 45050 |
| Feb. 13, 2006 | 898 | 624 | 290 | 7.46 | 2.9 | 0.35 | 47000 |
| Feb. 16, 2006 | 796 | 549 | 283 | 7.29 | 4.2 | 0.21 | 53710 |
| Feb. 17, 2006 | 797 | 551 | 309 | 7.44 | 4 | 0.37 | 56710 |
| Feb. 20, 2006 | 790 | 545 | 293 | 7.25 | 3.2 | 0.17 | 57124 |
| Feb. 21, 2006 | 795 | 548 | 290 | 7.43 | 4 | 0.016 | 59712 |
| Feb. 22, 2006 | 812 | 561 | 304 | 7.65 | 5.4 | 0.12 | 61971 |

*FIG. 27A*

TABLE 5-continued

| PILOT TEST METER AND TUBERCULATED 1" GALV. PIPE DATE: | COND | TDS | ORP | pH | TOTAL CL2 | FREE CL2 | TOTALGALS |
|---|---|---|---|---|---|---|---|
| Feb. 24, 2006 | 814 | 563 | 309 | 7.75 | 3.6 | 0.32 | 66612 |
| Feb. 28, 2006 | 815 | 564 | 248 | 7.27 | 2.18 | 0.78 | 69750 |
| Mar. 1, 2006 | 868 | 601 | 355 | 7.48 | 4.5 | 0.31 | 71702 |
| Mar. 2, 2006 | 803 | 554 | 277 | 7.72 | 3.3 | 0.24 | 73941 |
| Mar. 3, 2006 | 892 | 620 | 329 | 7.82 | 3.5 | 0.4 | 75134 |
| Mar. 6, 2006 | 798 | 551 | 320 | 7.61 | 3 | 0.43 | 78465 |
| Mar. 7, 2006 | 802 | 553 | 319 | 7.76 | 2.9 | 0.34 | 80458 |
| Mar. 14, 2006 | 804 | 555 | 282 | 7.6 | 1.96 | 0.13 | 80500 |
| Mar. 23, 2006 | 1193 | 845 | 568 | 7.58 | 5.8 | 1.9 | 83763 |
| Mar. 24, 2006 | 1203 | 843 | 635 | 7.43 | 4.9 | 1.78 | 84202 |
| Mar. 27, 2006 | 998 | 692 | 347 | 7.37 | 7.9 | 0.65 | 84260 |
| Mar. 31, 2006 | 1137 | 792 | 478 | 7.52 | 8 | 1.11 | 85820 |
| Apr. 3, 2006 | 1136 | 792 | 500 | 7.2 | 7.5 | 1.09 | 87030 |
| Apr. 5, 2006 | 1075 | 743 | 377 | 7.43 | 8.7 | 1.25 | 87280 |
| Apr. 6, 2006 | 0 | 0 | 0 | 0 | 0 | 0 | 87690 |
| Apr. 7, 2006 | 1066 | 742 | 535 | 7.58 | 7.3 | 0.92 | 70220 |
| Apr. 10, 2006 | 932 | 642 | 368 | 7.54 | 6.8 | 0.21 | 91307 |
| Apr. 12, 2006 | 1016 | 703 | 442 | 7.87 | 7.6 | 0.53 | 92180 |
| Apr. 13, 2006 | 996 | 665 | 455 | 7.59 | 6.2 | 0.523 | 92743 |
| Apr. 21, 2006 | 1176 | 818 | 589 | 7.4 | 6.3 | 2.08 | 95676 |
| Apr. 28, 2006 | 1076 | 746 | 591 | 7.49 | 6 | 2.4 | 104257 |
| AVERAGE | 924 | 640 | 378 | 7.45 | 4.64 | 0.86 | |

NOTE:
City Water showed variable residual Cl2 levels due to a wide array of city BPU pressure levels, flow rates, and dwell time issues normally associated with wholesale supply operations. These readings of City Water are valuable to compare with discharge water and their levels of Cl2 residuals.
RE-Ox treated water after test assembly (Discharge) Cl2 residuals ranged approximately 2 ppm higher and followed the trend in City Water levels.

*FIG. 27B*

TABLE 6

| Substance Tested | Units | Feb. 10, 2006 | Feb. 15, 2006 | Feb. 21, 2006 | Feb. 23, 2006 | Feb. 28, 2006 | Mar. 7, 2006 | Mar. 8, 2006 |
|---|---|---|---|---|---|---|---|---|
| Aluminum, Total (ICAP/MS) | ug/l | | 64.0 | | 0.0 | | | |
| Antimony, Total (ICAP/MS) | ug/l | | | | 0.0 | | | |
| Arsenic, Total (ICAP/MS) | ug/l | | 0.0 | | 0.0 | | | |
| Barium, Total (ICAP/MS) | ug/l | | 160.0 | | 170.0 | | | 170.0 |
| Beryllium, Total (ICAP/MS) | ug/l | | 0.0 | | 0.0 | | | |
| Cadmium, Total (ICAP/MS) | ug/l | | 0.0 | | 0.0 | | | |
| Calcium, Total (ICAP) | mg/l | | 74.0 | | 77.0 | | | 83.0 |
| Chromium, Total (ICAP/MS) | ug/l | | 0.0 | | 0.0 | | | 3.2 |
| Copper, Total (ICAP/MS) | ug/l | | 17.0 | | 32.0 | | | 16.0 |
| Iron, Total (ICAP) | mg/l | | 0.0 | | 0.023 | | | |
| Lead, Total (ICAP/MS) | ug/l | | | | 1.4 | | | |
| Magnesium, Total (ICAP) | mg/l | | 25.0 | | 26.0 | | | 27.0 |
| Manganese, Total (ICAP/MS) | ug/l | | 0.0 | | 0.0 | | | |
| Mercury | ug/l | | | | 0.0 | | | |
| Nickel, Total (ICAP/MS) | ug/l | | | | 0.0 | | | |
| Potassium, Total (ICAP) | mg/l | | 5.1 | | 5.3 | | | 5.4 |
| Selenium, Total (ICAP/MS) | ug/l | | | | 0.0 | | | |
| Silver, Total (ICAP/MS) | ug/l | | 0.0 | | 0.0 | | | |
| Sodium, Total (ICAP) | mg/l | | 60.0 | | 53.0 | | | 81.0 |
| Strontium (ICAP) | mg/l | | 0.52 | | 0.54 | | | 0.54 |
| Thallium, Total (ICAP/MS) | ug/l | | | | 0.0 | | | |
| Zinc, Total (ICAP/MS) | ug/l | | 16.0 | | 21.0 | | | 10.0 |
| Conductivity @ 25 Degrees C. | uMHOs/cm | | | | | 941.0 | | |
| Alkalinity, Phenolphthalein | mg/L-CaCO3 | 0.0 | | 0.0 | | 0.0 | 0.0 | |
| Alkalinity, Total (to pH = 4.5) | mg/L-CaCO3 | 221.0 | | 223.0 | | 219.0 | 227.0 | |
| Chlorine, Free | mg/L-Cl2 | <0.1 | | | | 0.31 | 0.34 | |
| Chlorine, Total | mg/L-Cl2 | 2.81 | | | | 4.50 | 2.90 | |
| Fluoride (IC) | mg/L | 0.84 | | 1.12 | | 1.10 | 1.05 | |
| Ammonia | mg/L | | | | | | | |
| Hardness, Total (Titrimetric) | mg/L-CaCO3 | 304.0 | | 334.0 | | 313.0 | 327.0 | |
| Coliforms, Total (via Colilert P/A) | 100 mL | Negative | | Negative | | Negative | Negative | |

*FIG. 28A*

TABLE 6-continued

| | | | | | |
|---|---|---|---|---|---|
| E. Coli (via Colilert P/A) | 100 mL | Negative | Negative | Negative | Negative |
| Heterotrophes (Spc Agar, Straight) | CFU/mL | <1.0 | <1.0 | <1.0 | <1.0 |
| Heterotrophes (Spc Agar, Duplicate) | CFU/mL | 1.0 | <1.0 | <1.0 | <1.0 |
| Heterotrophes (Spc Agar, Average) | CFU/mL | 1.0 | <1.0 | <1.0 | <1.0 |
| Color, APP. (Spectrometric-455 nm) | PCU | 4.00 | <1.0 | <1.0 | 3.00 |
| pH (Electrode) | SU | 7.61 | 7.27 | 7.49 | 7.35 |
| Turbidity (Nephelometric) | NTU | 0.299 | 0.153 | 0.128 | 0.122 |

| Substance Tested | Mar. 31, 2006 | Apr. 6, 2006 | Max With RE-Ox® | Avg With RE-Ox® | 2005 BPU Avg | Federal MCL |
|---|---|---|---|---|---|---|
| Aluminum, Total (ICAP/MS) | | | 64.0 | 32.0 | <0.025 | 200 |
| Antimony, Total (ICAP/MS) | | | 0.0 | 0.0 | <1 | 6 |
| Arsenic, Total (ICAP/MS) | | | 0.0 | 0.0 | <1 | 10 |
| Barium, Total (ICAP/MS) | | | 170.0 | 166.0 | 156.0 | 2000 |
| Beryllium, Total (ICAP/MS) | | | 0.0 | 0.0 | <1 | 4 |
| Cadmium, Total (ICAP/MS) | | | 0.0 | 0.0 | <0.5 | 5 |
| Calcium, Total (ICAP) | | | 83.0 | 78.0 | 73.0 | none |
| Chromium, Total (ICAP/MS) | | | 3.2 | 1.1 | 1.5 | 100 |
| Copper, Total (ICAP/MS) | | | 32.0 | 21.6 | 3.3 | 1300 |
| Iron, Total (ICAP) | | | 0.023 | 0.012 | <0.02 | 0.3 |
| Lead, Total (ICAP/MS) | | | 1.4 | 1.4 | <0.5 | 15 |
| Magnesium, Total (ICAP) | | | 27.0 | 26.0 | 23.0 | none |
| Manganese, Total (ICAP/MS) | | | 0.0 | 0.0 | <2.0 | 50 |
| Mercury | | | 0.0 | 0.0 | <0.2 | 2 |
| Nickel, Total (ICAP/MS) | | | 0.0 | 0.0 | 2.0 | none |
| Potassium, Total (ICAP) | | | 5.4 | 5.3 | 5.9 | |
| Selenium, Total (ICAP/MS) | | | 0.0 | 0.0 | <5.0 | 50 |
| Silver, Total (ICAP/MS) | | | 0.0 | 0.0 | 1.11 | 100.0 |
| Sodium, Total (ICAP) | | | 81.0 | 64.7 | 50.0 | none |
| Strontium (ICAP) | | | 0.54 | 0.53 | 0.530 | 8, pCi/L |
| Thallium, Total (ICAP/MS) | | | 0.0 | 0.0 | <1 | 2 |
| Zinc, Total (ICAP/MS) | | | 21.0 | 15.7 | 2.3 | 5000 |
| Conductivity @ 25 Degrees C. | | | 941.0 | 941.0 | 733.0 | |
| Alkalinity, Phenolphthalein | 0.0 | 0.0 | 0.0 | 0.0 | | |
| Alkalinity, Total (to pH = 4.5) | 228.0 | 220.0 | 228.0 | 223.0 | 214.0 | |
| Chlorine, Free | <0.1 | 1.09 | 0.340 | 0.348 | | |
| Chlorine, Total | 2.88 | 7.50 | 7.5 | 4.118 | | 4 |
| Fluoride (IC) | 1.06 | 1.04 | 1.12 | 1.035 | 0.97 | |
| Ammonia | | | | | 0.93 | |
| Hardness, Total (Titrimetric) | 324.0 | 320.0 | 334.0 | 320.333 | 297.0 | |
| Conforms, Total (via Colilert P/A) | Negative | Negative | Negative | Negative | | |
| E. Coli (via Colilert P/A) | Negative | Negative | Negative | Negative | | |
| Heterotrophes (Spc Agar, Straight) | <1.0 | <1.0 | <1.0 | <1.0 | | 500 |
| Heterotrophes (Spc Agar, Duplicate) | | <1.0 | 1.0 | <1.0 | | |
| Heterotrophes (Spc Agar, Average) | | <1.0 | 1.0 | <1.0 | | |
| Color, APP. (Spectrometric-455 nm) | 3.00 | 1.00 | 4.0 | 1.833 | 1.800 | |
| pH (Electrode) | 7.48 | 7.55 | 7.610 | 7.458 | 7.55 | 6.5-8.5 |
| Turbidity (Nephelometric) | 0.114 | 0.114 | 0.299 | 0.155 | 0.080 | 0.3 |

NOTES FOR TABLE 6
1. Elemental Analysis (data in black, Aluminum - Zinc) was by MWH Laboratory. Mineral and Physical analysis (data in bold, Conductivity - Turbidity) was by Nearman Laboratory). 2005 city BPU water analysis averages are from their Annual Report.
2. Analysis showed normal levels of copper and lead after discharge. Heterotropes and coliforms levels were below normal range. Aluminum level was much higher than city BPU averages are thought to be due to the release of this material which indicated its prior use by the utility.
3. Turbidity averaged .64 nu's higher than normal city BPU levels but were well below Federal MCL levels of 0.3 nu's.
4. Water Quality levels were considered by utility analysts to be above normal standards during this test.

*FIG. 28B*

METHODS AND COMPOSITIONS FOR TREATING WATER-CONTAINING SYSTEMS

This application is a continuation of U.S. patent application Ser. No. 13/755,850 filed on Jan. 31, 2013 and subsequently issued as U.S. Pat. No. 8,518,270 on Aug. 27, 2013, which in turn is a continuation of U.S. patent application Ser. No. 12/763,207 filed on Apr. 19, 2010, and subsequently issued as U.S. Pat. No. 8,366,939 on Feb. 5, 2013, which in turn is a continuation of U.S. patent application Ser. No. 11/973,872 filed on Oct. 9, 2007, published as U.S. Patent Application Publication No. US-2008-0116144-A1 on May 22, 2008 (abandoned), and which in turn further claims priority to U.S. Provisional Patent Application No. 60/828,879 filed on Oct. 10, 2006. Each of the foregoing applications is hereby incorporated by reference herein in their respective entireties, for all purposes.

BACKGROUND

Water contains organic matter, dissolved solids and minerals that deposit scale and film on surfaces in drinking water distribution pipes and equipment. Quality and flow of drinking water is deleteriously affected by these scales and films. In addition, many cleaning and sanitizing agents leave film residues. Use of the methods and compositions described herein control these deposits.

A variable matrix of organic and inorganic deposits accumulates on the interior surfaces of all drinking water distribution piping systems. Control of such deposits is the key to improved water quality, lower maintenance costs and efficient use of disinfectants. Organic-laden deposits of this kind are a significant source of increased chlorine demand and they can produce precursors of trihalomethanes and haloacetic acids disinfection byproducts. Variously called biofilms, scale or tuberculations, many deposits in drinking water systems have been shown to harbor and protect pathogenic or otherwise troublesome bacteria, viruses, algae and algal toxins, fungi, protozoa and invertebrates. Many types of microorganisms can proliferate in such deposits, and their toxic by-products can become problematic. Regardless of the level of residual disinfectant, microorganisms within these harborage deposits have been proven to periodically slough off and re-entrain into the flowing water, thereby contaminating other systems and exposing susceptible consumers to biological hazards from drinking water systems in the buildings they occupy.

Nearly everyone is familiar with "scale" such as occurs in a tea pot used with hard water. The white precipitate is calcium carbonate and it deposits onto the surface of the pot because the solubility of the salt is inversely related to temperature: as the temperature increases, the salt precipitates. But in drinking water systems, the scaling process is more complex and the water is not boiled (boiling water has a very destructive effect on organic compounds in water). Deposits in drinking water systems never include just calcium carbonate (or other inorganic substances). This is because organic materials in the water are prone to adhering to surfaces. Native organic compounds from bulk drinking water accumulate onto surfaces because adsorption is thermodynamically favored. Consequently, the deposits on surfaces in drinking water distribution systems include organic compounds and inorganic compounds such as "scale". These organic materials give the deposit characteristics which are much different than those scale deposits seen on the surface of a tea pot, for example.

SUMMARY

Methods for improving water quality by reducing chlorine demand, decreasing disinfection by-products and controlling deposits in drinking water distribution systems, include the steps of:
(a) determining the concentration of supplemental oxidants needed to improve water quality; and
(b) producing the needed concentration in drinking water distribution systems by adding the supplemental oxidants at a point after disinfectants are added to the system. If oxidants were used as disinfectants, it would be at a much higher concentration than the supplemental oxidants as disclosed herein.

A suitable oxidant is RE-Ox® which includes sodium hypochlorite.

RE-Ox® is prepared by:
(a) using high grade evaporated salt in a single pass brine system.
(b) electrolyzing the brine to form chlorine gas and sodium hydroxide using the apparatus of FIGS. 1-8; sodium ions, hypochlorite ions, hypochlorous acid and chloride ions may result;
(c) bleeding a small amount of sodium hydroxide; and
(d) forming sodium hypochlorite in the form of RE-Ox®.

RE-Ox® Deposition Control Chemical is a unique oxidizing solution. The solution is made of hypochlorous acid as well as other oxidizing compounds that have not been identified. The sum of all these oxidizing components results in a solution that very effectively disrupts the organic-laden deposits that accumulate in potable water distribution systems. The concentration of RE-Ox® described herein for drinking water distribution systems is far below that for which RE-Ox® would act as an antimicrobial agent. That is to say, the chemical is not acting as a disinfectant or biocide at these low concentrations but rather, it is acting to disrupt the deposits on surfaces in distribution systems. Furthermore, supplemental oxidants comprising sodium hypochlorite, e.g., RE-Ox®, are introduced into the water supply after disinfectants are added to the system.

RE-Ox® is applied at very low concentrations, below concentrations that would have any antimicrobial effect. At these very low levels, oxidants in the RE-Ox® solution, including hypochlorous acid, oxidize certain components of deposits in drinking water systems. These deposits include organic and inorganic compounds. The oxidizable components of the deposits are affected by the oxidants in RE-Ox®. In particular, the organic components of these deposits act like "glue" to hold the deposits together on surfaces.

RE-Ox® has been quantitatively shown in real world trials to successfully control deposits in drinking water systems. The use of very low concentrations such as 1-100 ppb of RE-Ox® in municipal drinking water systems reduces chlorine demand, decreases disinfection by-products (THMs and HAA5s), and controls deposits.

Surprising deposit control effects have been observed in the following concentration ranges of RE-Ox® (product): 1 gallon product dosed to 10,000 gallons of drinking water down to 1 gal product to 500,000 gal drinking water. (1 gal/10,000 gal to 1 gal/500,000 gal on an active ingredient concentration basis: 1-50 ppb active ingredient.) Use of higher concentrations of the product are not as useful in deposit control, or in some cases are too aggressive because too much material from surfaces may be too quickly entrained into the bulk water, deleteriously affecting water quality.

In real world trials with well-designed controls and observations, RE-Ox® Deposition Control Chemical also reduced chlorine demand by 16-31%, reduced THMs 66% and HAA5s 28% in municipal drinking water distribution systems while water quality was maintained and unsolicited customer compliments were received.

By lowering chlorine demand, the DBPs created in the distribution system correspondingly are reduced and help public water systems qualify for a waiver to many requirements of the Stage 2 DBP EPA regulatory requirements. In addition to reducing already relatively low chlorine demand and DBPs, RE-Ox® is useful for its water softening characteristics.

Ion exchange water softening is used for drinking water in areas where calcium carbonate, other calcium salts and iron oxide precipitation causes deposits on surfaces known as scale. Very low concentrations of RE-Ox® (e.g., 1-50 ppb active ingredient) applied to drinking water, reduces the need for water softening and in some cases has even eliminated the need for water softening altogether. The reason for this appears to be that low concentrations of RE-Ox® (far below the concentration necessary to kill microorganisms in drinking water) have an effect on the deposit matrix which includes inorganic and organic constituents that are subject to oxidation. In the "real world, these scaling deposits never include only inorganic salts (such as calcium carbonate); rather, they are always in nature a matrix of many different compounds some of which are organic. The organic compounds in the matrix are derived from living materials but are not necessarily living (the organics in these deposits can be and often are, inanimate and non-viable) and in other cases, there are in fact living organisms in these deposits commonly referred to as scale. The organic component of these deposits cause them to be much more sticky and give them characteristics different than the deposits would be if there were no organics present in the deposits. By conditioning the water with RE-Ox® oxidant, less scaling precipitate forms on surfaces. This effect has been very useful because reducing the need for water softening saves money and is environmentally preferred due to the elimination or reduction of brine waste from the water softening process.

The organic compounds in deposits on drinking water system components are oxidized by the unique combination of oxidants in RE-Ox®. The effect of these oxidations is to disrupt the deposit matrix. Disruption of the deposit matrix leads to gradual removal of deposit due the scouring action of flowing water over the surface. Deposit control is beneficial because of its positive effect on water quality.

BRIEF DESCRIPTION OF THE DRAWINGS

FIG. 22 is a table showing total chlorine residuals as a function of sampling site for twenty-nine (29) sampling sites, with readings before treatment with RE-Ox® (10-month average), during a burnout period, and after treatment with RE-Ox® (2-month average);
FIG. 23 embodies Table 1, providing TDA, ORP, and Free Available $Cl_2$ data as a function of sampling point for chlorinated water (averages of 17 samples taken from each sampling point location) before treatment with RE-Ox®;
FIG. 24 embodies Table 2, providing TDA, ORP, and Free Available $Cl_2$ data as a function of sampling point for chlorinated water (averages of 8 samples taken from each sampling point location) after treatment with RE-Ox®;
FIG. 25 embodies Table 3, providing average results ($Cl_2$, ORP, pH, TDS, and turbidity) for raw water, RE-Ox® treated water, and discharge water, respectively;
FIG. 26 embodies Table 4, providing data for treatment of three pipe sections following treatment with RE-Ox®;
FIGS. 27A-27B embody Table 5 (presented in two sections), providing test data (COND, TDS, ORP, pH, total $Cl_2$, free $Cl_2$, and total volume) for city water, and for water treated with RE-Ox®;
and
FIGS. 28A-28B embody Table 6 (presented in two sections), providing data for various analytes for water treated with RE-Ox®.

DETAILED DESCRIPTION

RE-Ox® technology, a specially formulated cleaning solution of activated sodium hypochlorite (NaOCl, bleach) engineered to eliminate scale and biofilm deposits from pipe during normal operations while maintaining water quality, has the unique ability to readily penetrate inorganic deposits as well as organic deposits/biofilms and destroy the organic glue that holds them together. RE-Ox® is non-hazardous, neutral pH, odorless and tasteless in water, and is NSF Standard 60 registered for drinking water. RE-Ox® technology is also used to control deposits/solids in various industries, including food processing, agriculture, healthcare and hospitality water distribution systems.

Figure 1:
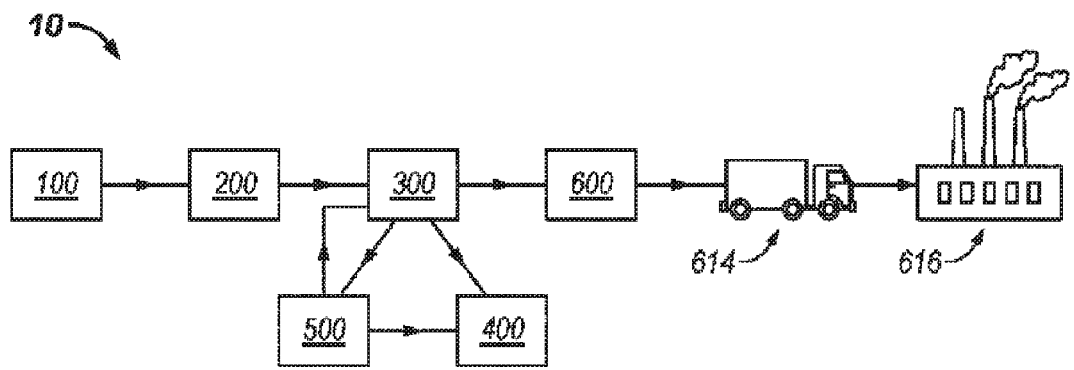
FIG. 1 shows a flow chart of the stages of the RE-Ox® system.

The RE-Ox® System 10 (FIG. 1) involves the production of an activated sodium hypochlorite that can be delivered to the customer, and does not have to be made on site. As seen in FIG. 1, the RE-Ox® System 10 involves six stages: brine creation 100, brine supply 200, reactor processing 300, waste removal 400, acid supply 500, and output 600.

In one embodiment, the entire process is conducted in an open environment temperature (~75 deg. F., +/−40 deg). Other embodiments involve the use of controlled, air-conditioned facilities for stages such as the reactor processing 300, waste removal 400, and acid supply 500. Other embodiments also involve the elimination of one or more of these stages, the consolidation of one or more stages, and the addition of more stages.

Figure 2:
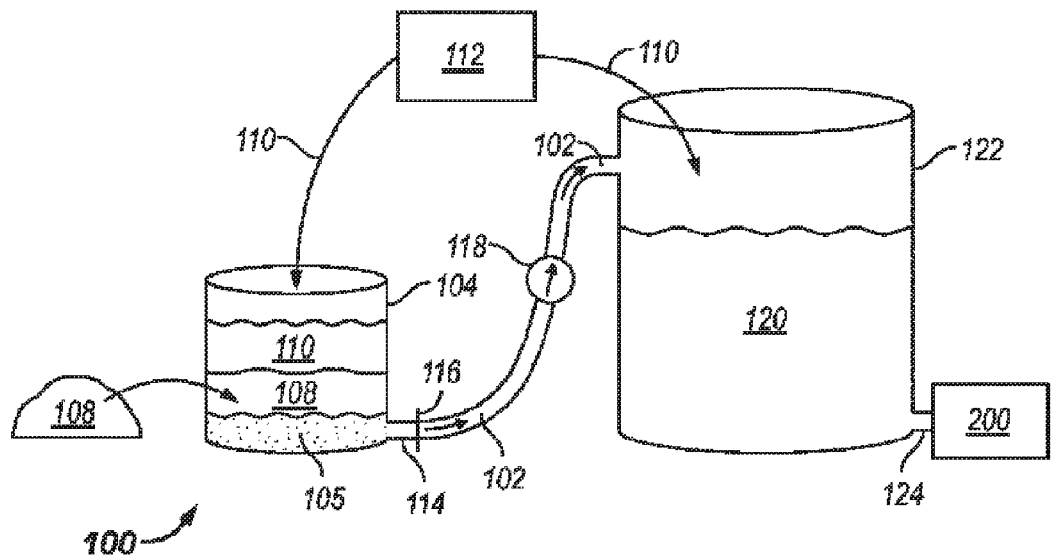
FIG. 2 shows the brine creation stage.

The brine creation stage 100 involves the creation of diluted brine 120 and is shown in more detail in FIG. 2. First, concentrated brine 102 is created in a concentrated brine tank 104. Sand 106 is placed in the bottom of the concentrated brine tank 104. Next, salt 108 is added into the concentrated brine tank 104. Water 110 is then added from a water supply 112.

Various grades of sand 106 can be used. The sand 106 is meant to serve as a filter, to act as a diffusing bed and to help supply uniform concentrated brine 102. In other embodiments, the sand 106 is replaced by diffusion beds or other media. In an embodiment, the salt 108 is 99.9% pure food high grade Morton brand sodium chloride (NaCl), though other embodiments involve the substitution of various other types, brands, and grades of salt 108. Sodium bromide, potassium chloride, potassium iodide, and calcium chloride are also contemplated.

The water supply 112 in the current embodiment is the municipal tap water supply. Other embodiments involve the use of water 110 from different water supplies 112. Highly mineralized, low mineralized, chlorinated, and chloraminated water 110 have all been used with no noticeable impact on the final product's performance.

The concentrated brine 102 is created by dissolving salt 108 in the water 110. In the current embodiment, concentrated brine 102 is created by passing water 110 through salt 108 in the concentrated brine tank 104. The water 110 is pulled through a concentrated brine tank output 114 and through a filter 116 by a concentrated brine pump 118. Other embodiments involve various other techniques of dissolving salt 108 in water 110. The salt 108 can be mixed with the water 110. The use of concentrated brine pump 118 can also be avoided by using gravity and valves.

Next, the concentrated brine 102 is used to make the diluted brine 120. The pump 118 is used to add concentrated brine 102 into a diluted brine tank 122. Water 110 is added into diluted brine tank 122 so that the conductivity of the diluted brine 120 is 9-10 millisiemens as measured by a conductivity meter. In other embodiments the targeted conductivity of the diluted brine 120 is different. For example, a conductivity of 25-30 millisiemens has been used with no noticeable impact on the final product's performance. Next, the diluted brine 120 exits the diluted brine tank 122 through the diluted brine output 124 and enters the brine supply stage 200.

The water 110 added to make the diluted brine 120 can be the same or different water supply 112 that is used to make the concentrated brine 102. In other embodiments, the diluted brine 120 is produced initially, without making concentrated brine 102 first by mixing given amounts of salt 108 with water 110.

Figure 3:
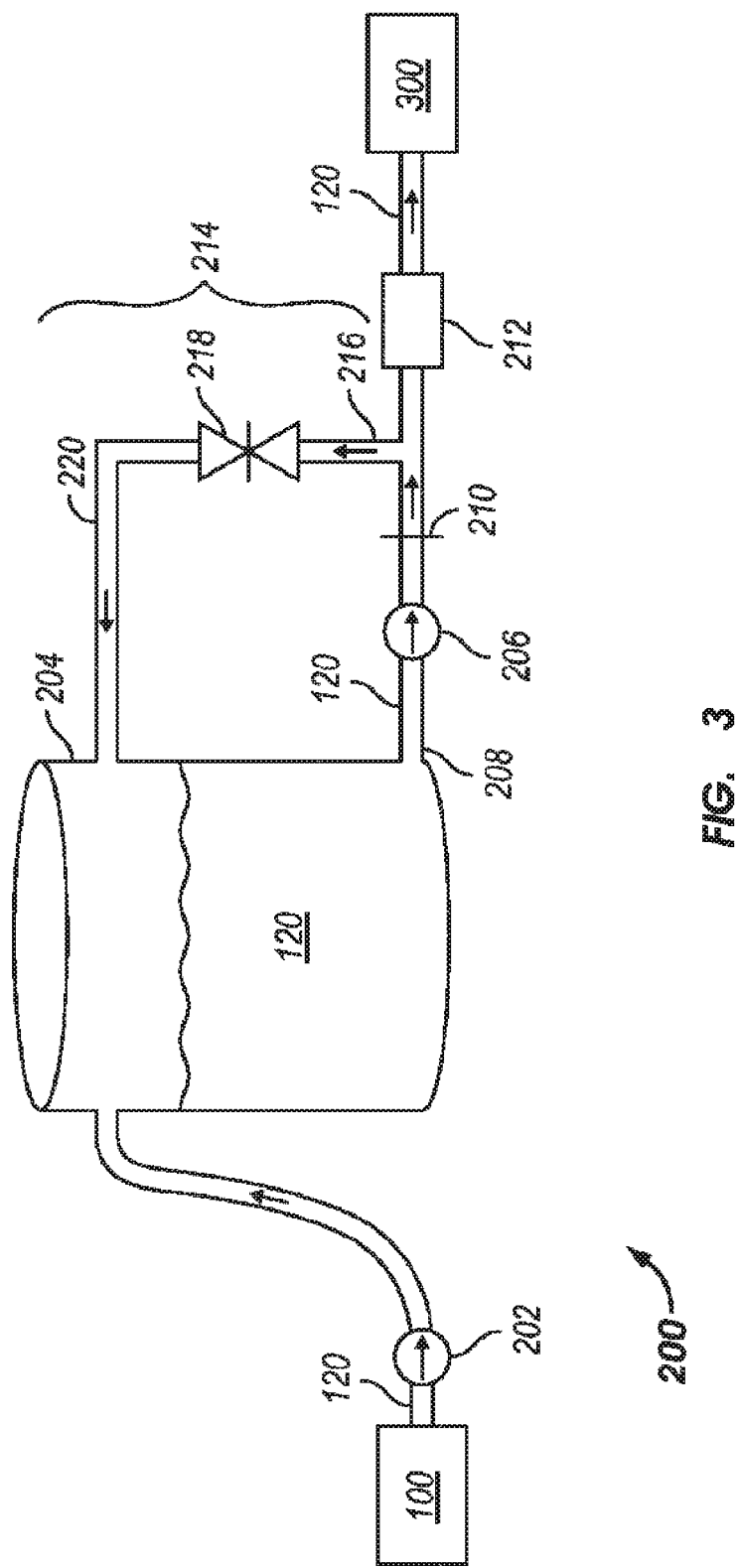
FIG. 3 shows brine supply stage.

Brine supply stage 200 involves the supply of diluted brine 120 to the reactor processing stage 300. As seen in FIG. 3, a diluted brine pump 202 is used to add the diluted brine 120 into a diluted brine holding tank 204. A supply pump 206 pulls diluted brine 120 through a holding tank output 208. The diluted brine 120 next passes through a screen 210, through a pressure regulator 212, and into the FEM processing stage 300. The pressure regulator 212 is used to deliver diluted brine 120 at a desired pressure and flow rate into the reactor processing stage 300.

A bypass 214 is also added to the brine supply stage 200 to help adjust the pressure before the diluted brine 120 reaches the pressure regulator 212. The bypass 214 includes a bypass entry 216 located before the pressure regulator 212, a bypass needle valve 218, and a bypass exit that returns to the diluted brine holding tank 204. The bypass needle valve 218 is opened or closed to decrease or increase the pressure and flow rate of the diluted brine 120 entering the pressure regulator 212.

In other embodiments, all or parts of the brine supply stage 200 are removed. Diluted brine 120 can be added to the reactor processing stage 300 directly from the brine creation stage 100. The use of the diluted brine holding tank 204 and diluted brine pump 202 can also be eliminated. The bypass 214 can also be eliminated. The pressure and flow rate of the diluted brine 120 entering the pressure regulator 212 and reactor processing stage 300 can be controlled in many different ways.

Figure 8:
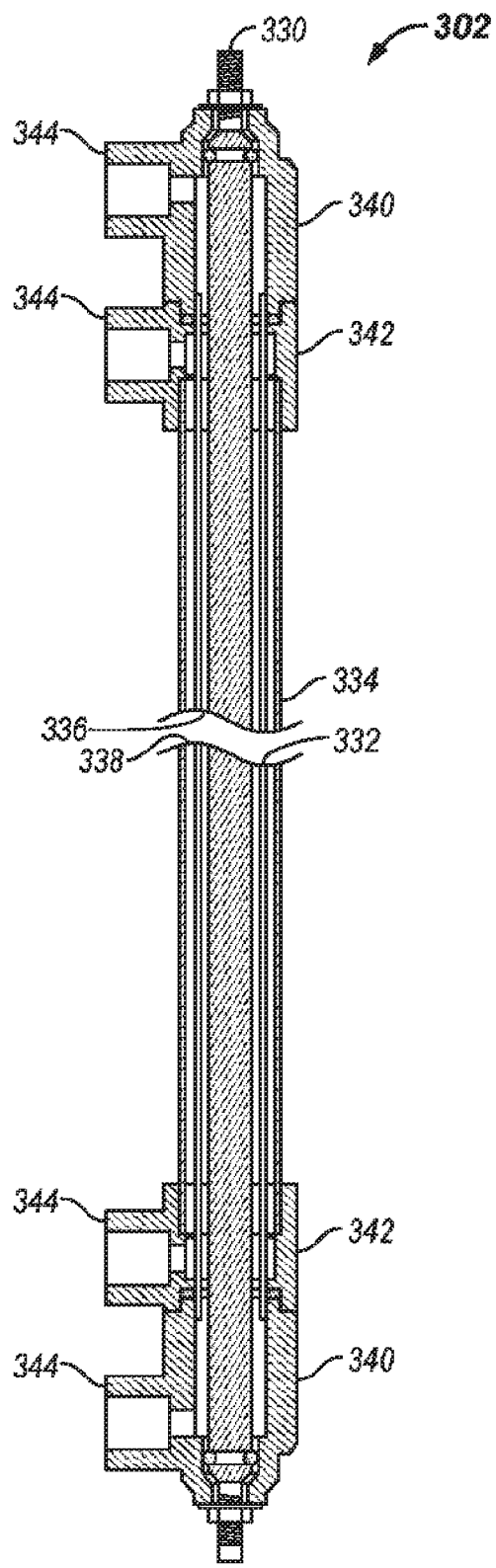
FIG. 8 shows the reactor cell.
Figure 9:
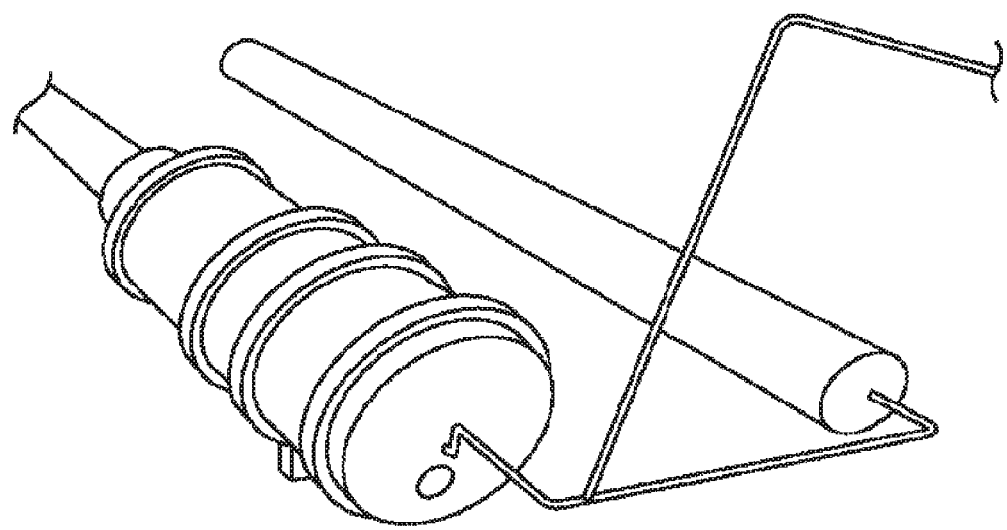
FIG. 9 illustrates a test of pipes and valves taken from service and assembled to receive a flow of RE-Ox® treated water.
Figure 10:
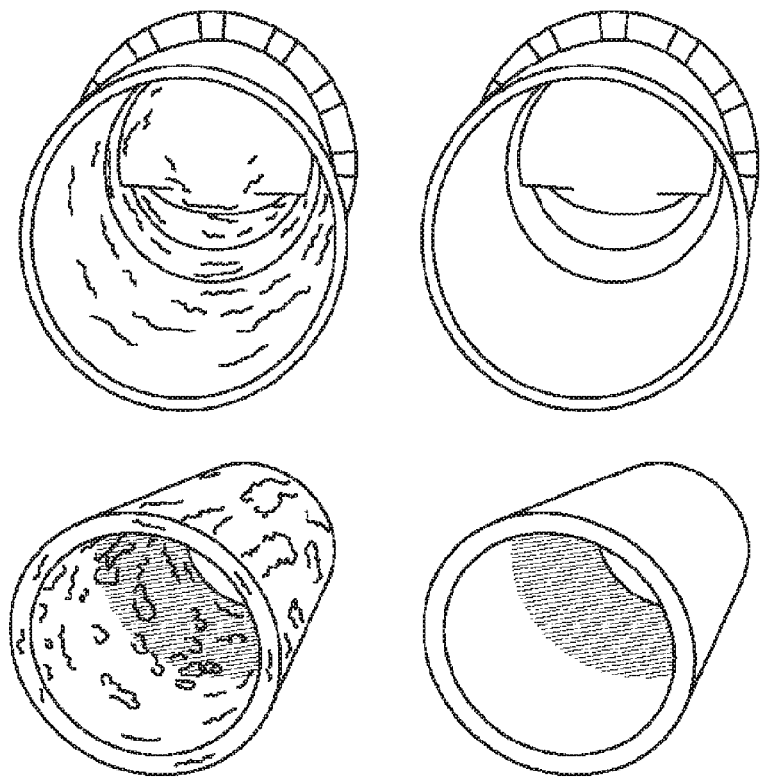
FIG. 10 shows results after RE-Ox® treatment (right side photos) showing deposits were removed from the pipe and valve surfaces with RE-Ox® in chlorinated water.

During the reactor processing stage 300, the diluted brine 120 is electrolyzed in reactor cells 302 to produce activated sodium hypochlorite 326. The reactor cells 302, also known as flow electrode modules (FEMs), are composed of three concentric components. A current embodiment is shown in FIG. 8. Other embodiments have used reactor cells 302 purchased from the VIIIMT Institute in Moscow Russia.

The reactors cells 302 include a center anode 330. The center anode 330 is titanium coated with a material consisting of iridium, rubidium, ruthenium, and tin. In one embodiment the iridium content is 48%-24%, the tin content is 40%-54%, the Ruthenium content is 8%-15%, and the rubidium content is 4%-7%. In other embodiments, the center anode is coated with pt-iridium. The material used for the center anode 330 can be varied based on conductivity, durability, and cost considerations. Various Siemens coatings can also be used.

Surrounding the center anode 330 is a membrane 332. The membrane 332 is ceramic. In one embodiment the membrane 332 is made from alumina. In other embodiments, an alumina and zirconia blend is used for the membrane 332. Various materials can also be used for the membrane 332 depending on porosity, insulative, durability, and cost considerations.

Beyond the membrane 332, and forming the exterior of the reactor cell 302, is the exterior cathode 334. In the current embodiment, the exterior cathode 334 is titanium. The material used for the exterior cathode 334 can also be varied based on conductivity, durability, and cost considerations. The length of the center anode 330 is greater than the exterior cathode 334 by one inch more in the current embodiment when compared with the VIIIMT Institute reactor cell 302. The membrane 332 is also longer than the exterior cathode 334.

An inside passage 336 is formed between the center anode 330 and the membrane 332. An outside passage 338 is formed between the membrane 332 and the exterior cathode 334.

At the ends of the reactor cells 302 are inside collectors 340 and outside collectors 342. The collectors 340 and 342 are made from Teflon® or another fluoroplastic. In other embodiments, the collectors 340 and 342 are made from polyethylene w/antioxidant additives. The inside collector 340 has a passage extending into the inside passage 336 and the outside collector 342 has a passage extending into the outside passage 338. The collectors 340 and 342 have female ⅛ inch national pipe taper fittings 344. The fittings 344 can have other sizes and fitting designs, including hose barb fittings. The top of the inside collector 340 in the current embodiment is elongated by half an inch when compared with the VIIIMT Institute reactor cell 302.

Figure 4:
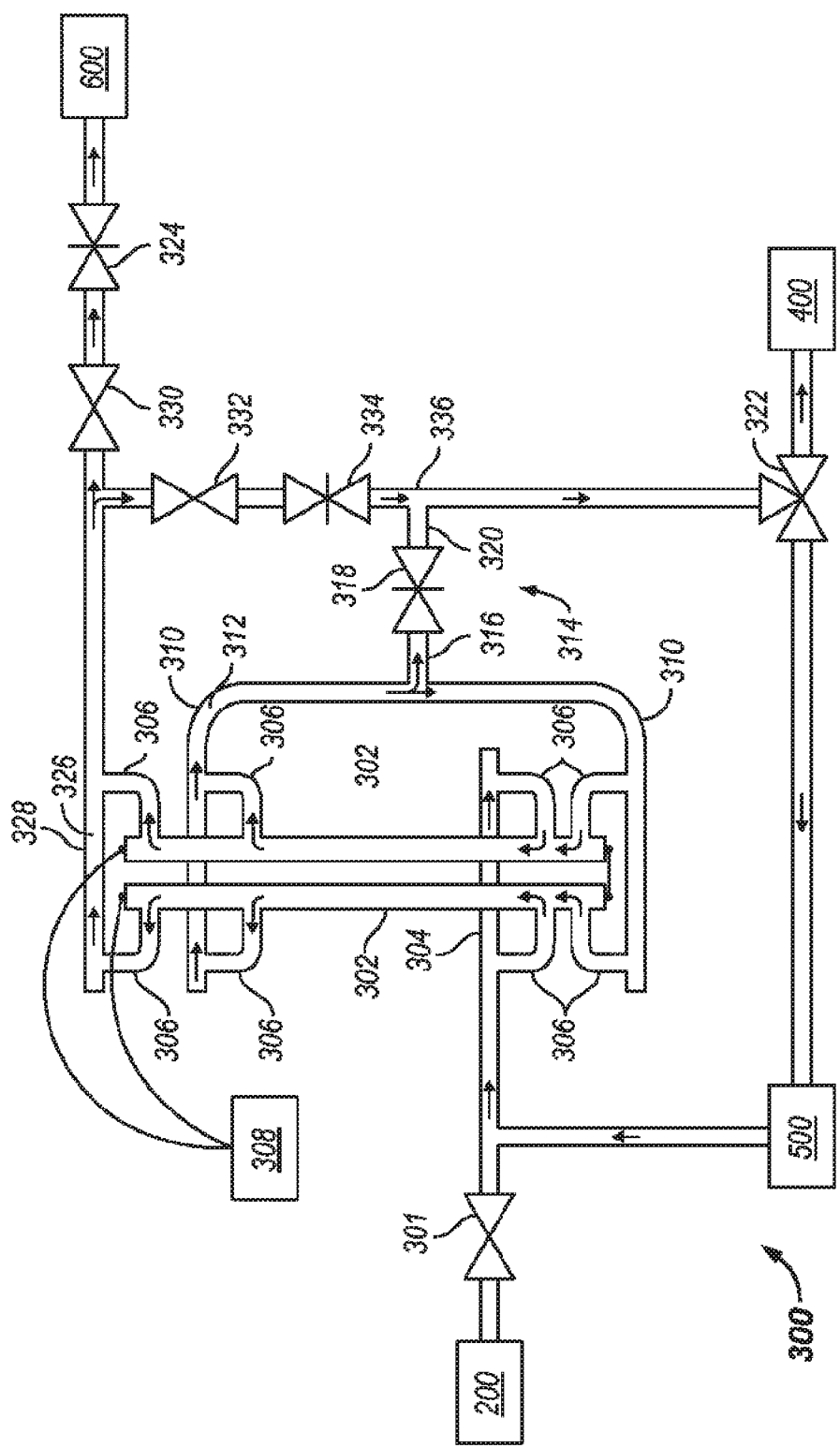
FIG. 4 shows the reactor processing stage.

As seen in FIG. 4, the reactor processing stage 300 begins with a feed valve 301, that when open supplies diluted brine 120 to a reactor supply header 304. The reactor supply header 304 delivers diluted brine to the outside passage 338 of the reactor cell 302 through a tube 306, fitting 344, and outside collector 342.

A power supply 308 delivers a direct electrical current (DC) to the center anode 330. As a result, the diluted brine 120 is electrolyzed to form chlorine gas and sodium hydroxide. These compounds then react with one another to form sodium hypochlorite.

In the current embodiment, ten groups of four reactor cells 302 are employed, for a total of forty reactor cells 302. Each reactor cell 302 receives 12 volts and 10 amps. Two of the four reactor cells 302 are wired in parallel, which are wired in series with the other two reactors cells in the group of four. FIG. 4 illustrates only two of the reactor cells 302. In other embodiments different wiring configurations are employed, including all reactor cells 302 being in series or in parallel.

This large number of reactors cells 302 forms a reactor bank that allows for the production of large quantities of activated sodium hypochlorite 326. With this number of reactor cells 302, pressure and flow rate of the diluted brine entering the reactor supply header 304 is adjusted to 5-10 psi and 1-2 gal/minute flow rate using the pressure regulator 212. The number of reactor cells 302 used can be increased or decreased to meet production needs. The pressure and flow rates supplied to the reactor bank are varied depending on the number of reactor cells 302 and the reaction.

The power supply 308 is an Allen Bradley linear unregulated unit. In other embodiments, a linear regulated power supply or an AC/DC/AC/DC switching power supply can be used. Any electric power supply 308 providing the needed control and power is sufficient. Multiple power supplies 308 can also be employed. The electric power to each reactor cell 302 from the power supply 308 can also be varied as needed.

With the power supply 308 on, the diluted brine 120 passes up the outside passage 338 and exits through a outside collector 342, through fitting 344, into tube 306, and into the recirculation header 310. The recirculation header 310 returns the now partially activated sodium hypochlorite 312 to the bottom of the reactor cell 302. The partially activated sodium hypochlorite 312 next passes through tube 306, into the inside collector 340, and up the inside passage 336.

In an embodiment, the amount or flow rate of partially activated sodium hypochlorite 312 passing through the inside passage 336 is reduced compared to the amount of diluted brine 120 that passed through the outside passage 338. This reduction in flow rate changes the flow of ions and reduces the pH of the final activated sodium hypochlorite 326. A siphon bleed 314 has been added to achieve this difference in flow rates. Without the siphon bleed 314, the final activated sodium hypochlorite 326 pH can be as high as 8.9.

The siphon bleed 314 removes 10-20% of the partially activated sodium hypochlorite 312 from the recirculation header 310. The siphon bleed 314 includes a siphon entrance 316 in the recirculation header 310. A siphon entrance 316 connects to a siphon needle valve 318 and to a siphon exit 320. The siphon exit 320 connects to a 3-way valve 322 that directs the partially activated sodium hypochlorite 312 to waste removal 400.

The percentage of activated sodium hypochlorite 312 siphoned off is controlled by adjusting the siphon needle valve 318 and a supply needle valve 324 at the end of the reactor processing stage 300. Other embodiments involve different methods of changing the flow rates between the inside and outside passages 336 and 338. The sizes of the inside and outside passages 336 and 338 can be altered, or a buffer tank can be added, or a pressure regulator added.

After the partially activated sodium hypochlorite passes through inside passage 336 it becomes the final activated sodium hypochlorite 326. The activated sodium hypochlorite 326 passes through the inside collector 340, out fitting 344, through tube 306, and into a discharge pipe 328. Next, the solution passes through a supply valve 330, supply needle valve 324, and to the Output Stage 600.

Production of activated sodium hypochlorite 326 is periodically stopped for a cleaning. Cleaning involves three cycles: 1) an initial rinse cycle, 2) an acid rinse cycle, and 3) a final rinse cycle. In the current embodiment, cleaning is performed once each hour of production. In other embodiments the timing of the cleaning is varied depending on cost and the amount of build up or scale. Frequent cleaning cycles have been shown to improve activated sodium hypochlorite 326 quality.

During the initial rinse cycle the power supply 308 is turned off, the supply valve 330 is closed, and a rinse out valve 332 is opened. A rinse out needle valve 334 is opened to control the amount diluted brine 120 that passes through and forces a split of flow through both the siphon bleed 314 and rinse out line 336. The 3-way valve 322 directs the flow of diluted brine 120 to the waste removal stage 400 after passing through the reactor processing stage 300. The initial rinse cycle lasts for 80 seconds in the current embodiment; though times can vary depending on size of the unit, flow rates, cleaning frequency, and desired results.

After the initial rinse cycle is the acid rinse cycle. During the acid rinse cycle, the power supply 308 remains off, the supply valve 330 remains closed, and the rinse out valve 332 remains open. The feed valve 301, however, is closed.

Figure 6:
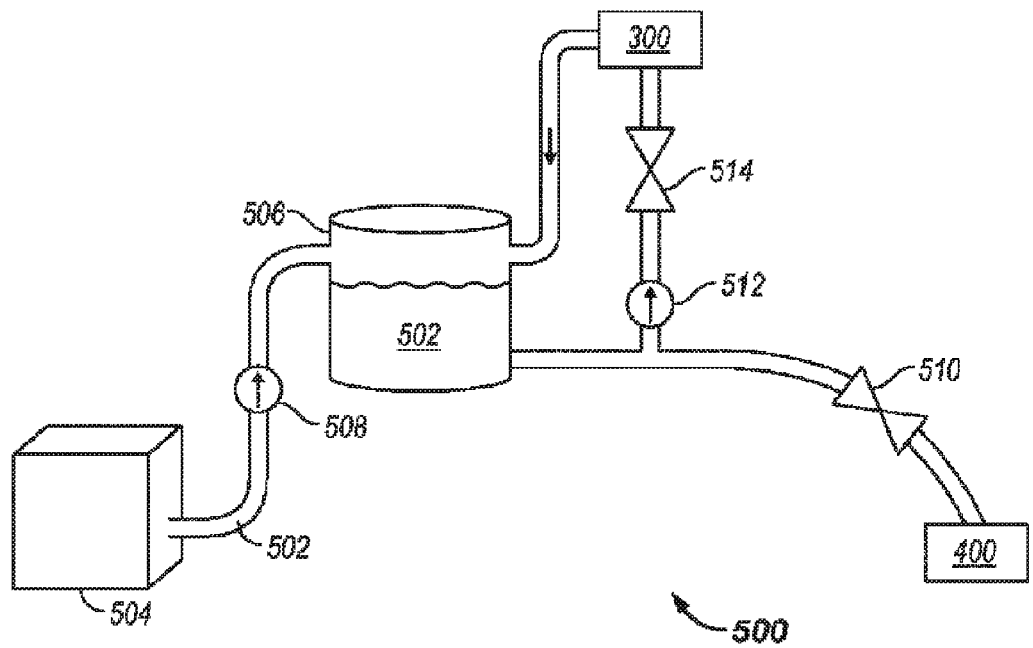
FIG. 6 shows the acid supply stage.

Acid 502 is supplied for the acid rinse cycle from the acid supply stage 500. As seen in FIG. 6, the acid supply stage 500 includes an acid supply tank 504 that supplies acid 502 to an acid holding tank 506 using an acid supply pump 508. A solenoid valve 510 controls the flow of acid to the waste removal stage 400. An acid rinse pump 512 and acid in valve 514 are used to supply acid to the reactor processing stage 300 during the acid rinse cycle. In the current embodiment, the acid is 5% hydrochloric acid (HCl). The strength of the acid can be varied depending on need.

During the acid rinse cycle, the acid in valve 514 is opened and the acid 502 is allowed to pass through the reactor processing stage 300. The 3-way valve 322 is set to direct the acid 502 back to the acid holding tank 506 to be reused. The acid rinse cycle lasts for five minutes. In other embodiments, the length of the acid rinse cycle varies based on the time between cleanings, size of the system, strength of the acid, and need for cleaning.

Next, during the final rinse cycle, the acid in valve 514 is closed and the 3-way valve 322 directs the flow to the waste removal stage 400. The feed valve 301 is also opened. The diluted brine 120 is again run through the reactor processing stage for 160 seconds and goes into the waste removal stage 400. Now the cleaning cycle is complete and the rinse out valve 332 is closed, the supply valve 330 is opened, the power supply 308 is turned back on, and production of activated sodium hypochlorite 326 begins again.

Figure 5:
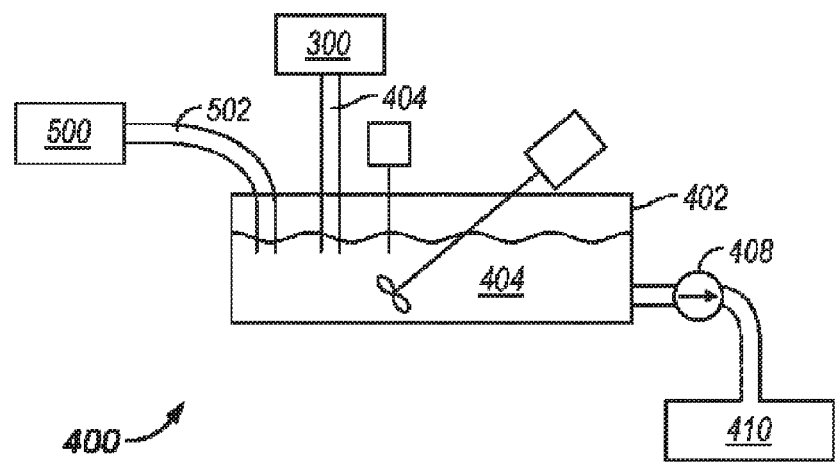
FIG. 5 shows waste removal stage.

The waste removal stage 400 involves the receipt and removal of the waste from the siphon bleed 314 and cleaning cycle. As seen in FIG. 5, the waste removal stage includes a waste tank that receives the waste 404 from the 3-way valve 322. A pH meter 406 is used to monitor the pH. Before the waste 404 can discarded, the pH must be reduced. Solenoid valve 510 is opened to add acid 502 from the acid supply stage 500 to the waste 404. A mixer 406 mixes the waste and once the pH is brought down to 7 a waste pump 408 is used to remove it to the sewer 410.

Figure 7:
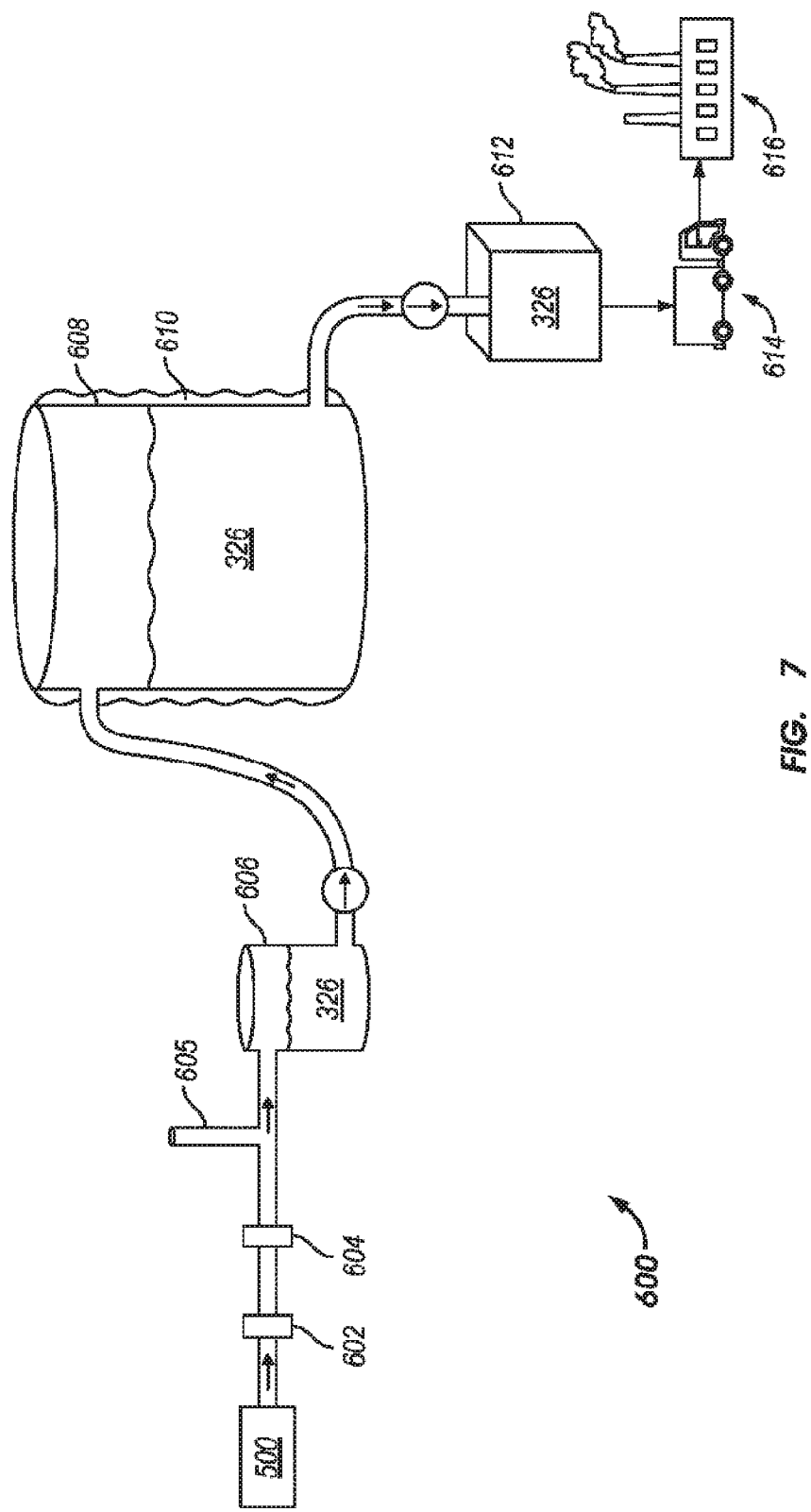
FIG. 7 shows the output stage.

After the supply needle valve 324, the activated sodium hypochlorite 326 passes into the output stage 600. As seen in FIG. 7, the activated sodium hypochlorite 326 passes through a flow meter 602 and a pH meter 604. These meters 602 and 604 can be used to automate portions of the process, especially the siphon bleed 314, to obtain the desired final pH of the activated sodium hypochlorite 326. After the pH meter 604 is a vent line 605 to vent hydrogen gas produced during the process. The activated sodium hypochlorite 326 then enters a holding tank 606.

The activated sodium hypochlorite 326 in the holding tank 606 is monitored for quality. A pH reading of 6.5-7.5 is desired. Titration is also conducted using a Hach digital titrator Method 8209 (Hach Co., Loveland, Colo.) to measure the total chlorine content, with anything above 625 ppm being acceptable.

Next the activated sodium hypochlorite 326 is pumped to an insulated storage tank 608. The insulation 610 helps keep the temperature consistent. A large concern in supplying activated sodium hypochlorite is shelf life. Degradation is caused as chlorine gas is off gassed, lowering pH, and chlorine content. Accordingly, some companies supply the machines to produce the solution on site. These companies have reported only a shelf life of 2 weeks. In contrast, the process described herein produces an effective shelf life of 3 months or more.

Degradation of the activated sodium hypochlorite 326 is a function of temperature and time, with rapid degradation occurring in direct sunlight. Reducing the temperature improves shelf life. The solution exiting the reactor cells 302 is approximately 100° F. Chilling the solution immediately after exiting the reactor cells 302 improves the shelf life. Improvements can also be achieved by refrigerating the solution in the storage tank 608. In one embodiment, a fluoroplastics heat exchanger is used. The specific fluoroplastics utilized can be Kynar® polyvinylidene fluoride (PVDF) (Arkema Inc., Philadelphia, Pa.) or Teflon® polytetrafluoroethylene (E.I. du Pont de Nemours and Company, Wilmington, Del.).

From the storage tank 608, the activated sodium hypochlorite 326 is pumped into PE totes 612 or barrels. The activated sodium hypochlorite 326 is a dilute oxidizer and can be corrosive over time. The best materials for handling these solutions are fluoroplastics, PVC, and PE.

The activated sodium hypochlorite 326 is now ready for the transportation 614 to the customer 616. The customer 616 then injects the activated sodium hypochlorite 326 into its water lines.

The customer 616 is able to utilize the activated sodium hypochlorite 326 without having onsite facilities to produce the activated sodium hypochlorite 326. Such onsite facilities can be difficult to maintain, and the quality of the activated sodium hypochlorite 326 is difficult to monitor. The RE-Ox® System 10 allows the customer 616 to receive the activated sodium hypochlorite 326 directly avoiding these problems.

RE-Ox® prevents nucleation which is a key requirement for the crystallization of minerals from solution directly on surfaces. Nucleation is the beginning of scales, films and other deposits. Existing mineral scales cannot be sustained and new scales cannot form without continuous nucleation.

RE-Ox® disrupts the attachment mechanisms of mineral scales and other deposit constituents in water systems, as no other known chemical approved for potable water applications has been shown to do. As a result, systems in which the RE-Ox® treated water is used rapidly becomes cleaner and remains cleaner.

RE-Ox® treated water eliminates scale and other deposition in the entire water distribution system without interruption to facility operation and prevents the need for facility shut down for hazardous acid treatment or pipe removal and replacement. Deposition removal in water systems, equipment, floors, walls and drains results in cleaning environments in a unique way. Metal and plastic surfaces become exceptionally clean. They are cleaned at the microscopic as well as the visual level.

Comparison To Chloraminated Water: Chloraminated water is produced by adding ammonia to chlorinated water to produce chloramines. The softening/conditioning benefits of RE-Ox® treated water are due to it being a scale and biofilm reducing water, whereas non treated water and chloraminated water is not. The chloraminated water is significantly deposit forming. Also, the chlorine demand in the chloraminated portion of the distribution system creates problems maintaining a chlorine residual and the correct ratio between ammonia and chlorine resulting in, among other issues, taste and odor problems in the water. In one trial, the DBP testing of the company's chloraminated water (THM—52 µg/l, HAA5—28 µg/l) revealed significantly higher results than their chlorinated water (THM—16.0 µg/l, HAA5—6.9 µg/l).

By removing and preventing the formation of scales and biofilm in pipe, chlorine demand is reduced so that residuals can be maintained thereby elevating water quality.

By cleaning the distribution system with RE-Ox®, thereby reducing chlorine demand, greater residuals with less chlorine are maintained. DBPs minimizes conditioned high performance water is delivered.

EXAMPLES

Example 1

Use of RE-0x0 by a Suburban Water Company

A water company tested using RE-Ox® as part of its water treatment for the 302,000 gallons of water per day it provides to its 1400 customers. The company wanted to reduce its chlorine demand to minimize DBPs in anticipation of the new EPA Stage 2 Disinfection By-product rules, and to optimize its water quality for its customers. The company found that after the first four months of testing, the treatment is exceeding expectations by reducing the chlorine demand 16-31%, reducing THMs 66% and HAA5s 28%, all while water quality was maintained and unsolicited customer compliments were received.

Background:

The company obtains its water from two sources; its own two wells, which are chlorinated with gaseous chlorine and chloraminated water purchased from a city public water supply. The distribution system has 65 miles of pipe ranging from 1½" PVC to 24" ductile iron, one 39,000 gallon standpipe and a new 1.5 million gallon reservoir. The two differently treated waters are distributed to separate areas and do not mix with each other. The company does not secondarily treat the chloraminated water. The efforts for periodic biofilm burnoff phases are executed by the water wholesaler.

Flushing is labor intensive, causes interruptions in service, wastes water and is not effective in removing the scale and biofilm deposits that develop in water distribution systems and are chlorine demand. Pigging can remove scale deposits, but is expensive and labor intensive. Pigging requires that the system be taken out of service to be done in sections and also consumes extreme quantities of water. Phosphates condition water but do not remove deposits and are a nutrient source for bacteria.

Treatment Results (First Four Months):

The chlorine demand in a water distribution system after RE-Ox® treatment began, compared to before treatment, was calculated by comparing the difference in the chlorine residuals just after chlorination at the well houses to those out at the sampling/distribution sites. (See Tables 1, 2, 3 as embodied in FIGS. 23-25.) The number of sampling sites and location of a few of the sites were increased during the treatment phase to better observe the results of the RE-Ox® treatment. The RE-Ox® cleaning process was followed from the well house(s) through the system as the free and total chlorine sampling results came closer and the ORP increased. Comparing all the distribution system sites before and after yielded a 1.72 ppm average $Cl_2$ before and 1.63 ppm after. With an average of 1.08 ppm $Cl_2$ before RE-Ox® and 1.19 ppm during treatment between the two wells, the respective demand was 0.64 ppm compared to 0.44 ppm during the first four months of monitored treatment showing a 0.20 ppm (31%) reduction. If a deadend sampling point (#9) is eliminated from the statistical analysis of the data the reduction is 0.12 ppm (23%) (0.52 ppm before, 0.40 ppm after). The chlorine demand in the deadend leg has reduced 0.30 ppm (21%), from 1.46 ppm before to 1.16 after (a deadend point has more deposits because there is less flow therefore, it will take longer for this leg to reduce deposits with the minimum flow of treated water; RE-Ox® is poorly mixed and not much RE-Ox® reaches this point). If just the sites that were exactly the same location as sampled before treatment baseline are calculated, the chlorine reduction was 0.07 ppm (16%), from 0.44 before to 0.37 after.

Water testing, as required by the state, showed that the water quality was maintained. The water provided by the company is sampled three times each month and submitted to a state laboratory for testing to ensure that its water is safe and meets all requirements.

Disinfectant by-product tests on the chlorinated water sample taken at a local site before RE-Ox® treatment resulted in 16.0 µg/l THM and 6.9 µg/l HAA5. Tests on water sampled from the site on about 6 weeks after/during RE-Ox® treatment revealed 5.43 µg/l THM and 4.0 µg/l HAA5. This represents a reduction of 66% in THM's and >28% reduction in HAA5.

Stage 2 Disinfectant by-Product Rule:

The company receives some of its finished water from another source, so the EPA considers it a consecutive system. The system is subject to the requirements of the new EPA Stage 2 Disinfection By-product Rule, which has been developed to improve the quality of potable water and provide additional protection from disinfection byproducts. Trihalomethanes (THM), haloacetic acids (HAA), chlorite, and bromate form when chlorine reacts to organic matter found in water and in the distribution system deposits (system chlorine demand). The Stage 2 rule will limit exposure to two groups of DBPs: trihalomethanes (TTHM) and haloacetic acids (HAM). Utilities will be required to conduct an evaluation of their water distribution systems known as the Initial Distribution System Evaluation or IDSE. The purpose of the IDSE is to identify the locations with high concentrations of DBPs, problem areas, initial disinfection regimes and operational inadequacies that cause systems to develop DBPs. The systems will use these locations as sampling sites for Stage 2 DBP rule compliance monitoring. A waiver for this monitoring can be obtained under conditions that include the finding that for eight consecutive quarters within a specified eligibility period, no samples exceeded 0.040 mg/L for THMs and 0.030 mg/L for HAA5. The reduction of DBPs brought by the reduction of chorine demand from the RE-Ox® treatment, will aid companies with the waiver requirements.

Example 2

Can RE-Ox® be Used in a Public Water Supply?

A State Department of Health was reluctant about the company in Example 1 using RE-Ox® even though it is NSF Standard 60 registered and allowable in public water per state statutes, so a trial was conducted to demonstrate the applicability of the technology to treat public water systems. In conjunction with other water utilities in the geographic area, the company conducted a Pilot Trial in which RE-Ox® treated chlorinated well water removed solids from scaled and tuberculated pipes and valves taken from service. The results were so noteworthy that a second trial was performed using RE-Ox® in the chloraminated water obtained from the water wholesaler.

The first part of the Pilot Trial represented an on-line constant flow treatment in which scale was softened and reduced, chlorine demand was reduced and turbidity was not adversely affected. The second part represented an off-line flushing treatment wherein the balance of RE-Ox® softened scale was flushed out of the system. The second trial in chloraminated water also removed scale and tuberculation deposits from galvanized pipe and water meters. Water samples were taken and tested throughout both trials and showed that water quality was maintained. The trials showed that eliminating the deposits that create chlorine demand facilitated chlorine residuals.

Example 3

Results of RE-Ox® on Deposit Laden Pipes Retrieved from Service

Figure 11:
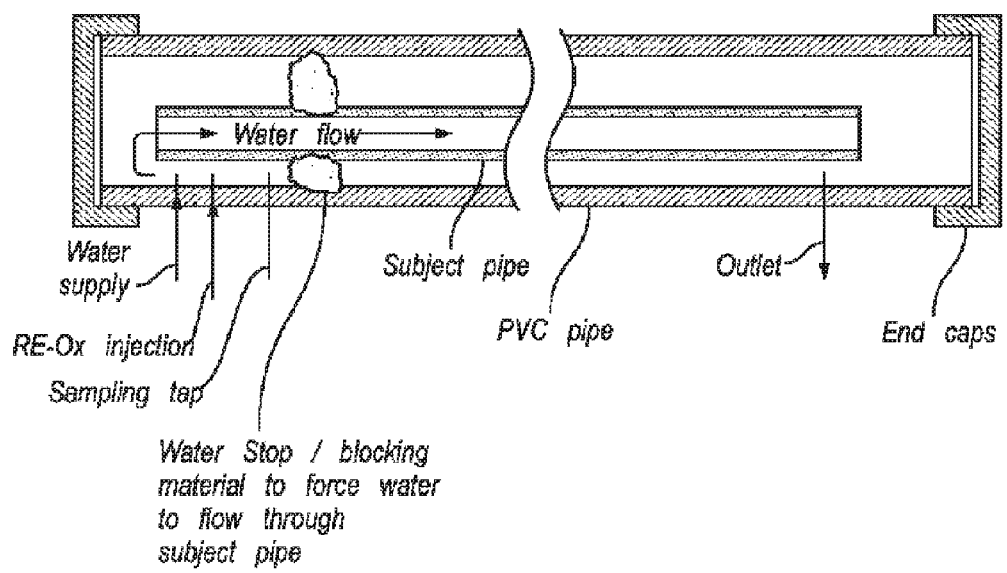
FIG. 11 shows a diagram of a test assembly.
Figure 12A:
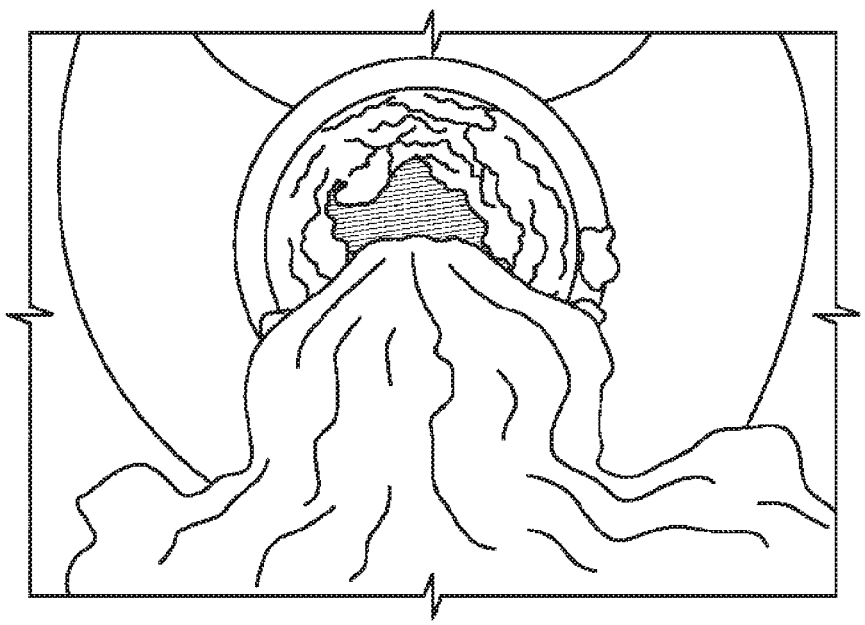
FIG. 12(A) is a photo inside of a PVC pipe showing the end of test pipe with deposit material reducing pipe flow area to approximately 30% of pipe ID before RE-Ox® treatment.
Figure 12B:
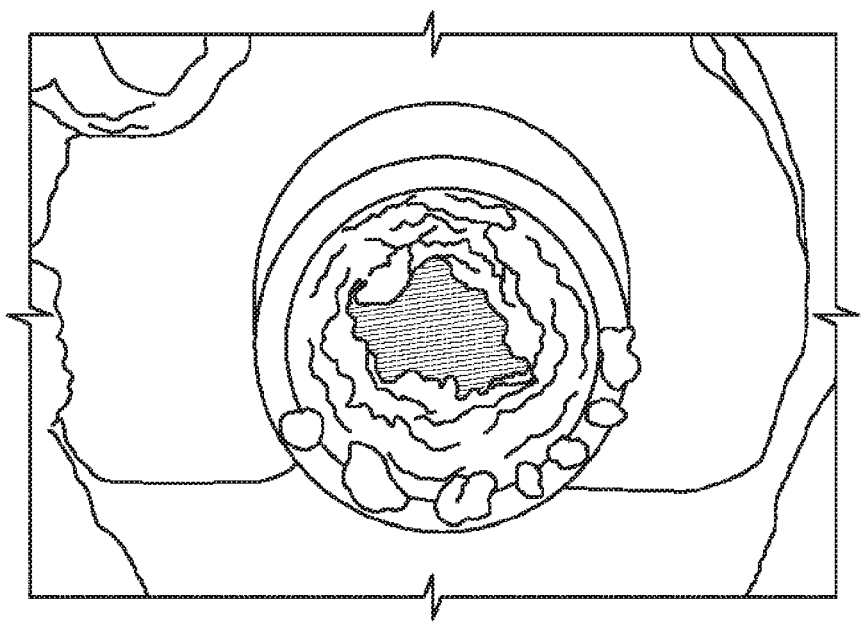
FIG. 12(B) is a photo of the end of pipe 1 after 106 days, RE-Ox® treated water removed approximately 50% of deposit material.

A city water department conducted a trial to verify the deposit removal capability of RE-Ox® treated water on 2" pipes retrieved from service. The pipe was heavily tuberculated with iron, scale and biofilm deposits. The deposit material had reduced the pipe open area to be approximately 30% of total pipe inner dimension. (See Table 4 (FIG. 26), FIG. 11, and FIGS. 12(A)-(B)).

The pipe was made in 1948 and has been in service since 1950. The pipe was taken out of service and divided into 3 sections, photographed and each was weighed after drying for one day. Pipe number 1 was soaked in undiluted RE-Ox® for 8 hours, allowed to dry one day and then weighed again. The presoaking treatment caused 1 lb (17%) of the material to release.

All three pipes were assembled consecutively inside a 6" PVC pipe so RE-Ox® treated water would flow through. A simple peristaltic chemical pump provided RE-Ox® to water diverted to test assembly dosing 1 gallon of RE-Ox® to 5000 gallons of treated water. Treated water flowed at 2 gpm.

After 106 days of continuous treatment, pipes were removed and allowed to dry for one day. Visual inspection verified significant deposit removal and increase in pipe ID. Pipe weights after drying one day revealed 50% total matter removal for pipe number 1. This was attributed to it being pre-soaked.

The pilot test was simple to set up and to monitor on site. The marked ability of RE-Ox® to eliminate tuberculation is seen as a potential replacement for phosphates for corrosion and deposit prevention (long term) and as a remediation methodology to clean the utility distribution system over the next few years. Anticipated system remediation dosing rate would be 1/15,000

In terms of water quality, daily sampling showed elevated chlorine residuals and lower turbidity rates.

Example 4

Results of RE-Ox® Water Treatment on Water Meters and Galvanized Pipe in Chloraminated Water RE-Ox® treated water was used to remove deposition from tuberculated pipes and scaled water meters. RE-Ox® treatment represented an in service treatment of cleaning pipes in chloraminated water. Having shown effectiveness in chlorine treated water, it was thought that RE-Ox® might not be effective in chloramine treated water. However, RE-Ox® treatment caused deposits to soften and disintegrate, water quality was maintained, chlorine residuals were maintained, and turbidity did not overly increase. This trial demonstrates the applicability of RE-Ox® treatment in public water systems, even when chloraminated, without interruption of service to the customer.

1. Pipes and meters were retrieved from water utility distribution systems, including:
    3-34" Water Meters
    14' of 1" Galvanized Pipe 2. The pipe had uniform tuberculation throughout its length. The pipe was cut into six sections. Three sections were set aside as a control and three were assembled in series along with the meters. This assembly was connected to a 1" water supply line, providing chloramine treated water from distribution branch. RE-Ox® was added to the supply water just prior to entering the test assembly with a water-driven proportional chemical pump.

3. Water supply flowed continually. Water volume was changed periodically to approximate normal use and averaged 2 gpm.

4. RE-Ox® treatment ran for about 4 months. Water chemistry analysis was performed regularly on incoming city water and water leaving test piping/meters. Samples of water leaving test assembly were taken throughout the trial for typical water quality analysis to test for conformance to Federal and State requirements.

Figure 13:
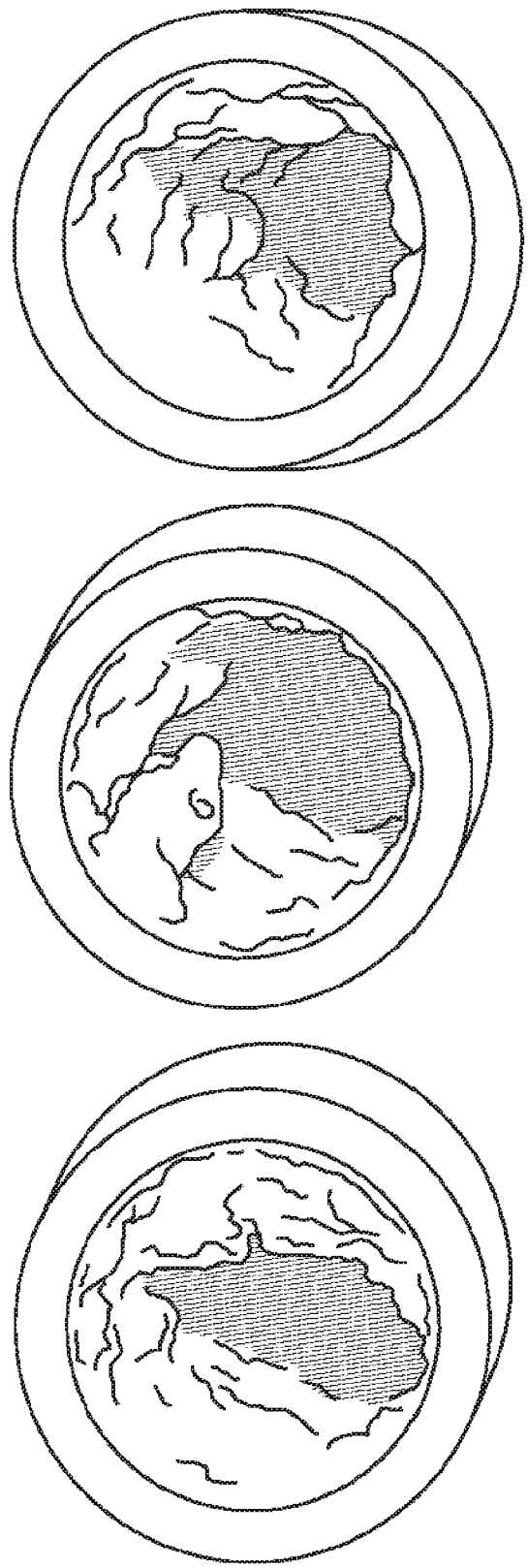
FIG. 13 shows that an entire length of 14' long pipe was uniformly encrusted with tuberculation.
Figure 14:
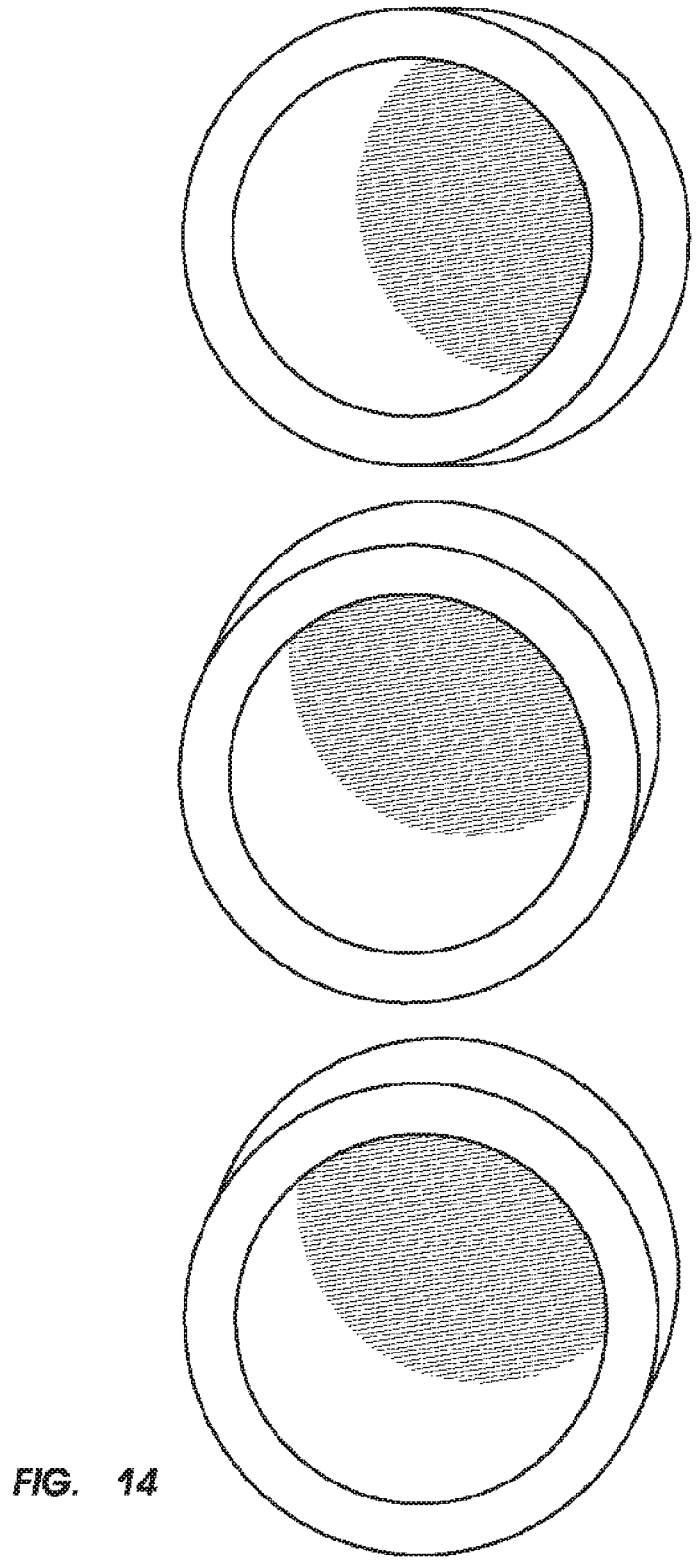
FIG. 14 shows that deposition was reduced by RE-Ox® treated water as shown in pipes from a test assembly after treatment.

Results:
A. Scaling and deposits reduced (FIGS. 13, 14)
B. Water quality was maintained and safe to drink
C. Water quality met or exceeded federal and state requirements
D. Chlorine residuals maintained to end of system
E. Turbidity did not overly increase Example 5

Water Improvement in a University Hospital

A building in a University Medical Center had a Legionella contamination problem. Quarterly remediation had been necessary using thermal means. Chlorine dioxide was used throughout campus, but a secondary disinfectant was necessary at this building.

Common Objections/Concerns to Hyper-Chlorination

Hyper-chlorination is a short-term fix for Legionella remediation. Because it is not effective at biofilm and deposit removal, Legionella will quickly re-populate. Also high levels of chlorine create a corrosive environment that destroys alloy and steel piping. The corrosive nature of hyper-chlorination could release corrosion by-products such as lead and copper. Hyper-chlorination causes disinfectant by-products (DBPs) such as haloacetic acids and trihalomethanes, which is a known cancer carcinogen. Hyperchlorination can also increase the pH of the waters which can lead to other corrosive properties.

Trial Description

RE-Ox® product was injected into the incoming city water line to the building. The product was fed via proportional feed based on water flow. The water feeds the domestic cold and recirculating hot water systems. 23 distal points were measured for environmental changes. Baseline sampling was conducted at these points for 4 weeks prior to the start of RE-Ox® program. Sampling was conducted for another 8 weeks after the start of the RE-Ox® treatment. The overall intent of the trial was to measure the effectiveness of RE-Ox® for the removal and prevention of Legionella bacteria.

Besides the effect on the taste and odor of the water, other concerns needed to be addressed when adding a chemical to a potable water systems (i.e. water had to be within acceptable standards):
Legionella bacteria (CDC);
Corrosivity (Langelier and Ryznar Indices);
Release of lead or copper (EPA 200.8);
Volatile organic compounds (EPA 502.2);
Trihalomethanes (EPA 502.2);
Haloacetic acids (EPA 552.2); and
Heterotrophic bacteria (EPA SM92 15).

Figure 15:
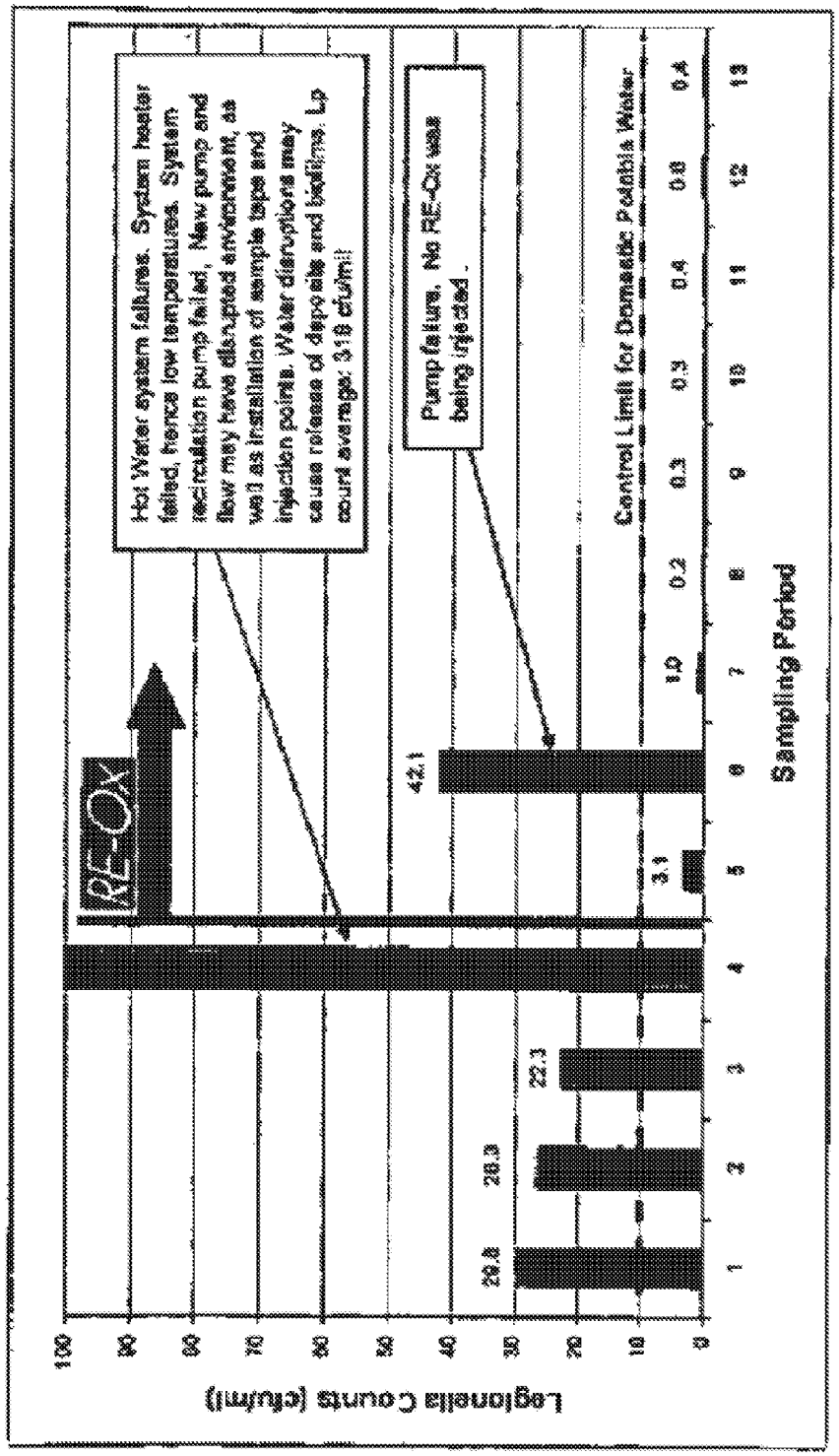
FIG. 15 is a bar chart showing hot water *Legionella* bacteria count (cfu/ml) as a function of sampling period, with sampling periods 1 to 4 prior to treatment with RE-Ox®, and with sampling periods 5 to 13 after treatment with RE-Ox®.
Figure 16:
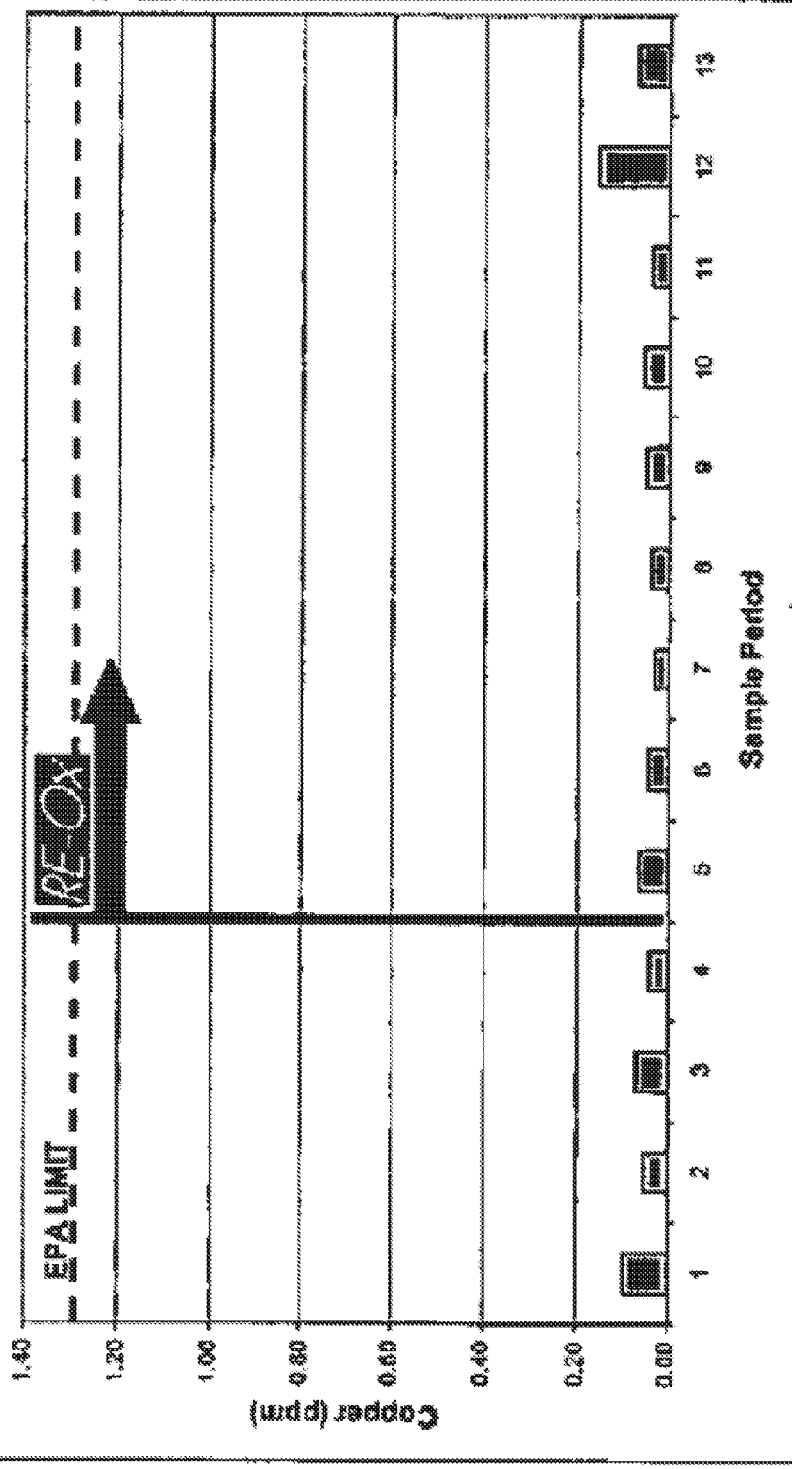
FIG. 16 is a bar chart showing hot water copper averages (ppm) as a function of sampling period, with sampling periods 1 to 4 prior to treatment with RE-Ox®, and with sampling periods 5 to 13 after treatment with RE-Ox®.
Figure 17:
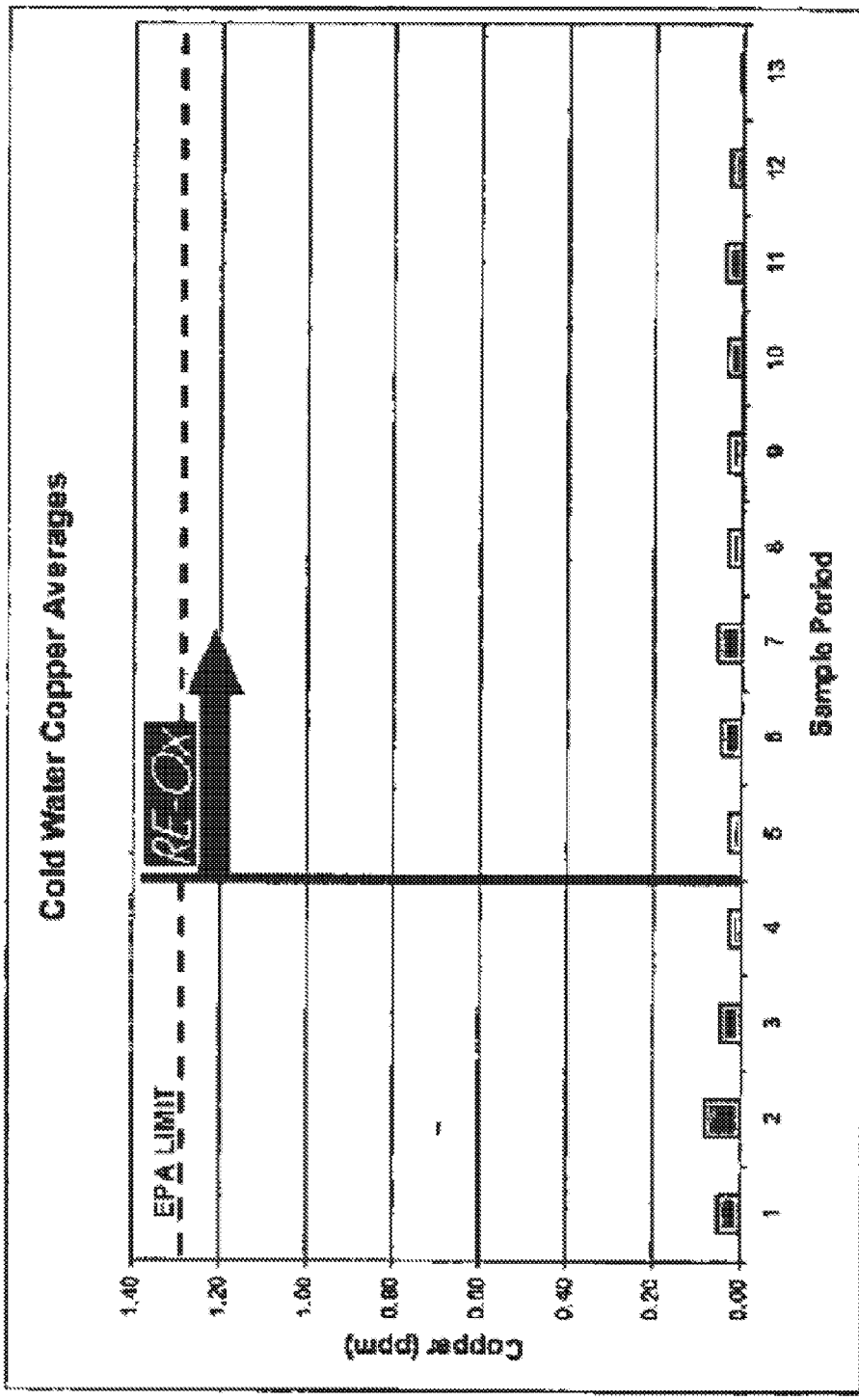
FIG. 17 is a bar chart showing cold water copper averages (ppm) as a function of sampling period, with sampling periods 1 to 4 prior to treatment with RE-Ox®, and with sampling periods 5 to 13 after treatment with RE-Ox®.
Figure 18:
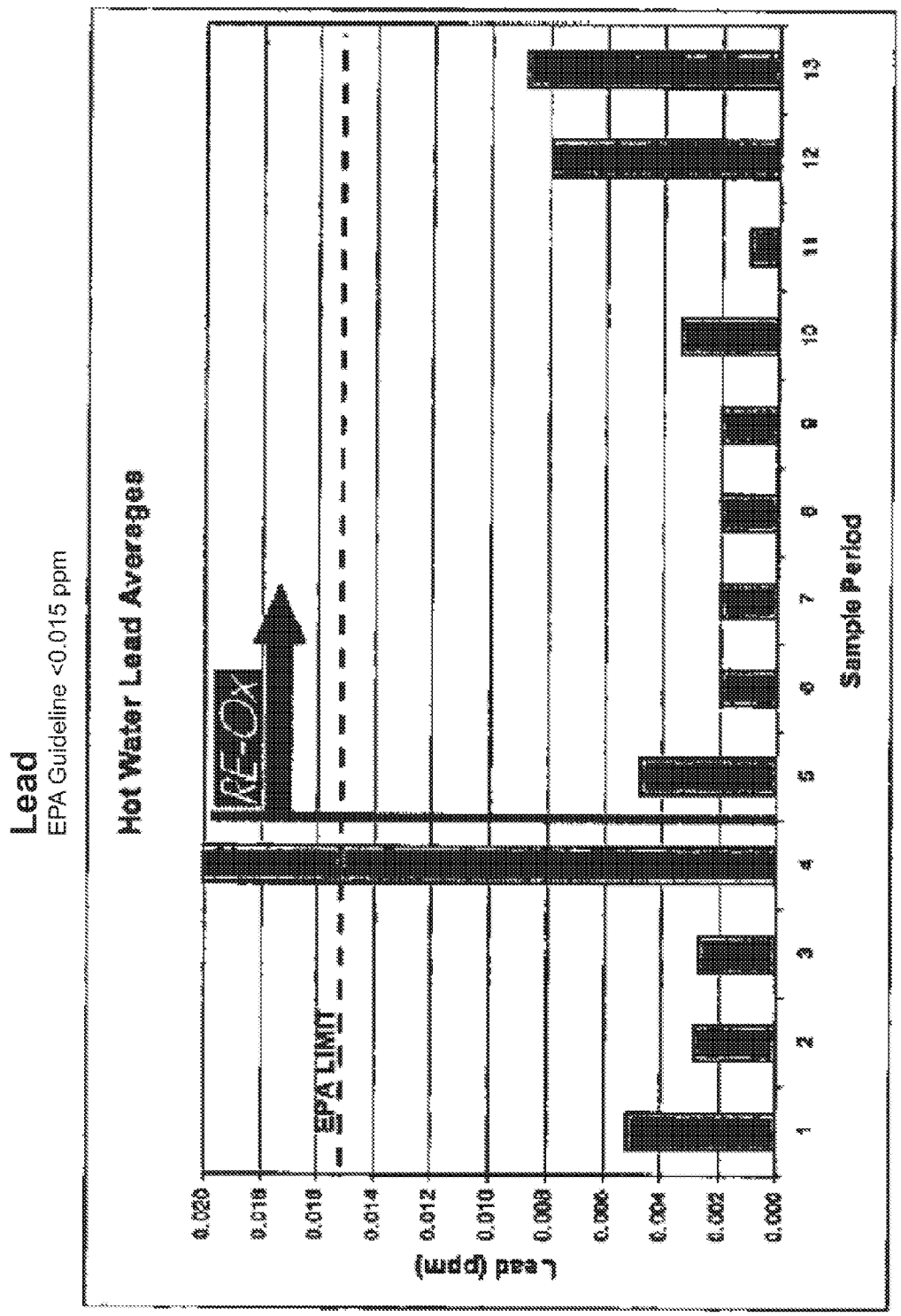
FIG. 18 is a bar chart showing hot water lead averages (ppm) as a function of sampling period, with sampling periods 1 to 4 prior to treatment with RE-Ox®, and with sampling periods 5 to 13 after treatment with RE-Ox®.
Figure 19:
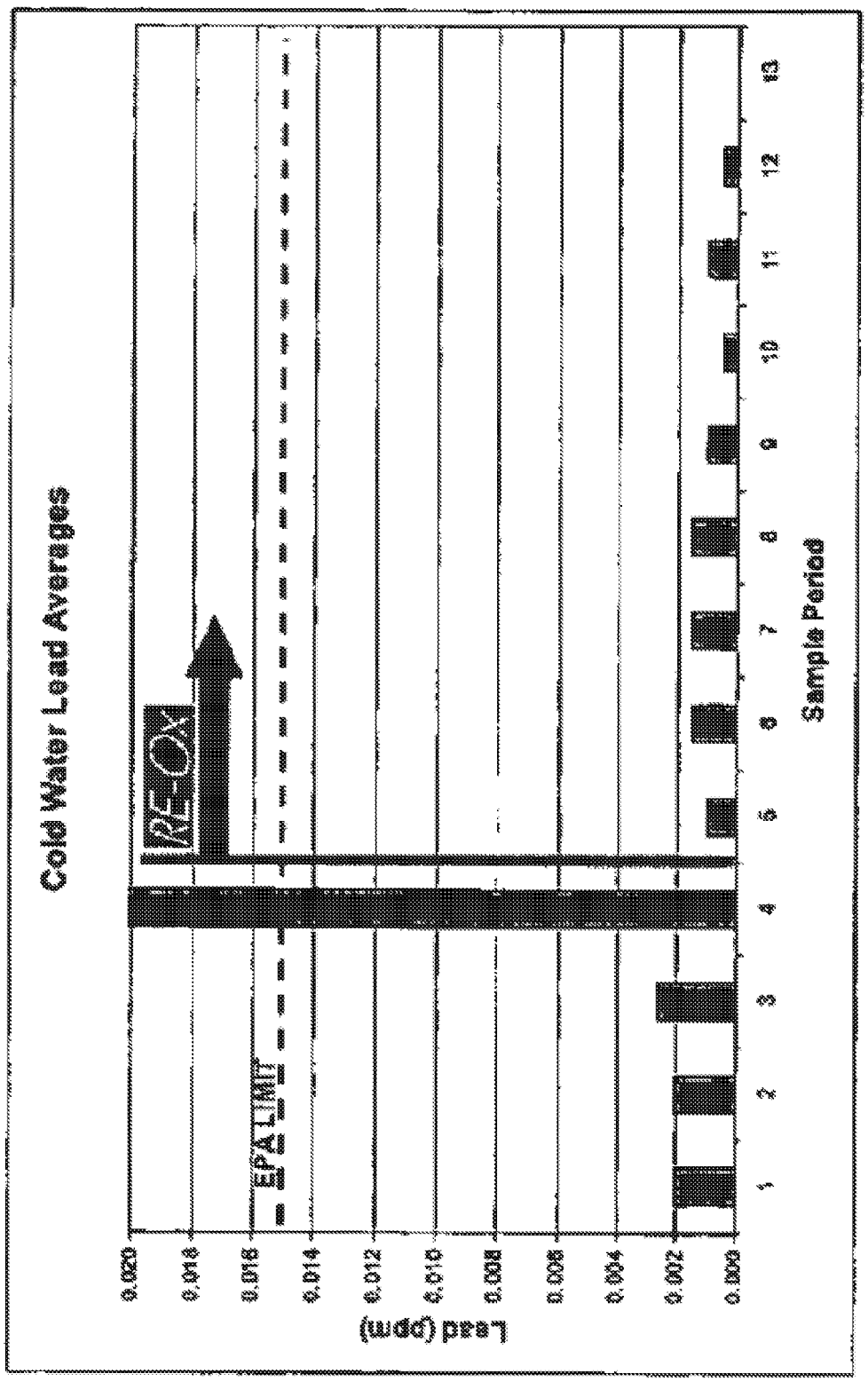
FIG. 19 is a bar chart showing cold water lead averages (ppm) as a function of sampling period, with sampling periods 1 to 4 prior to treatment with RE-Ox®, and with sampling periods 5 to 13 after treatment with RE-Ox®.
Figure 20:
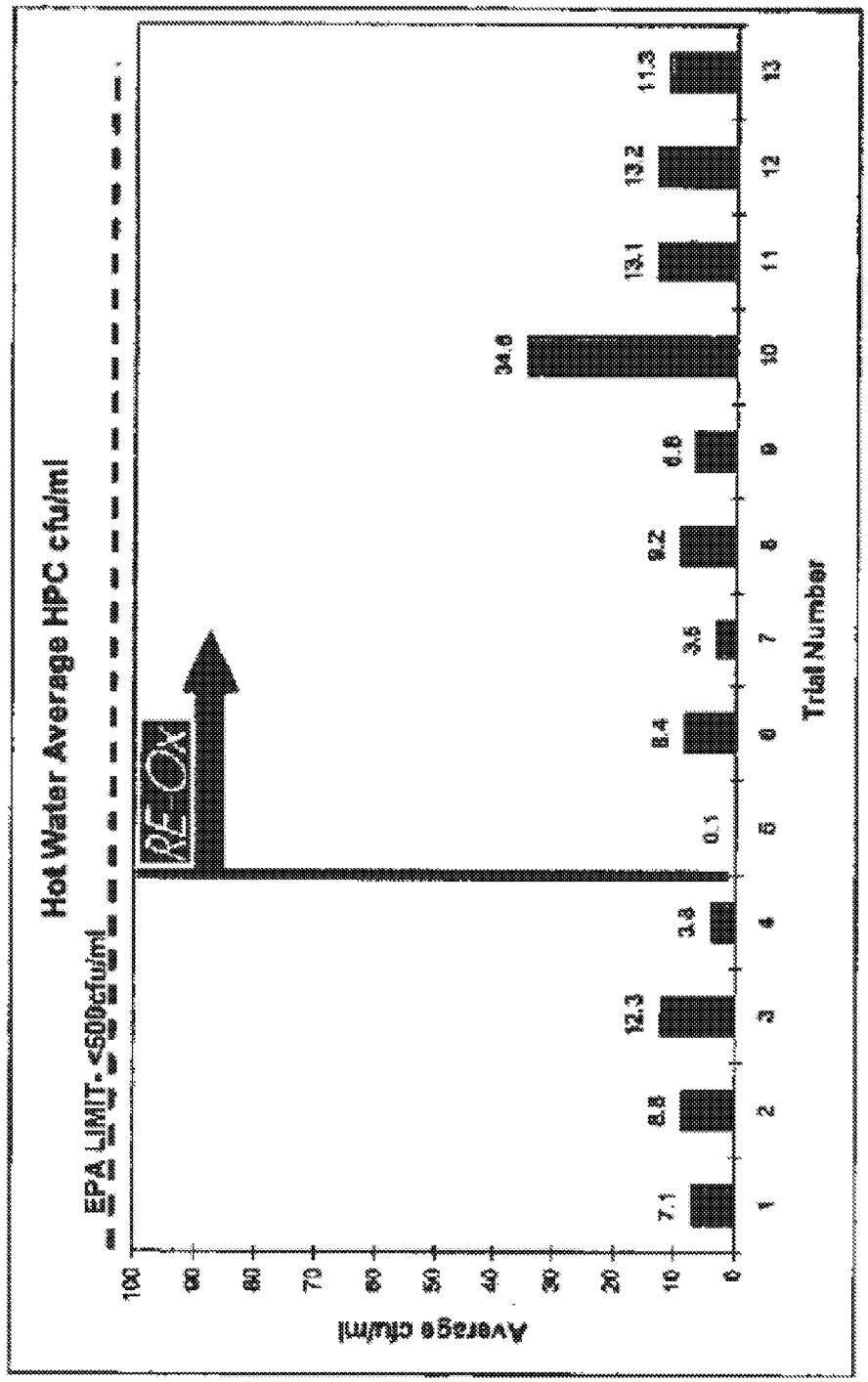
FIG. 20 is a bar chart showing hot water average heterotrophic bacteria count (cfu/ml) as a function of sampling period, with sampling periods 1 to 4 prior to treatment with RE-Ox®, and with sampling periods 5 to 13 after treatment with RE-Ox®.
Figure 21:
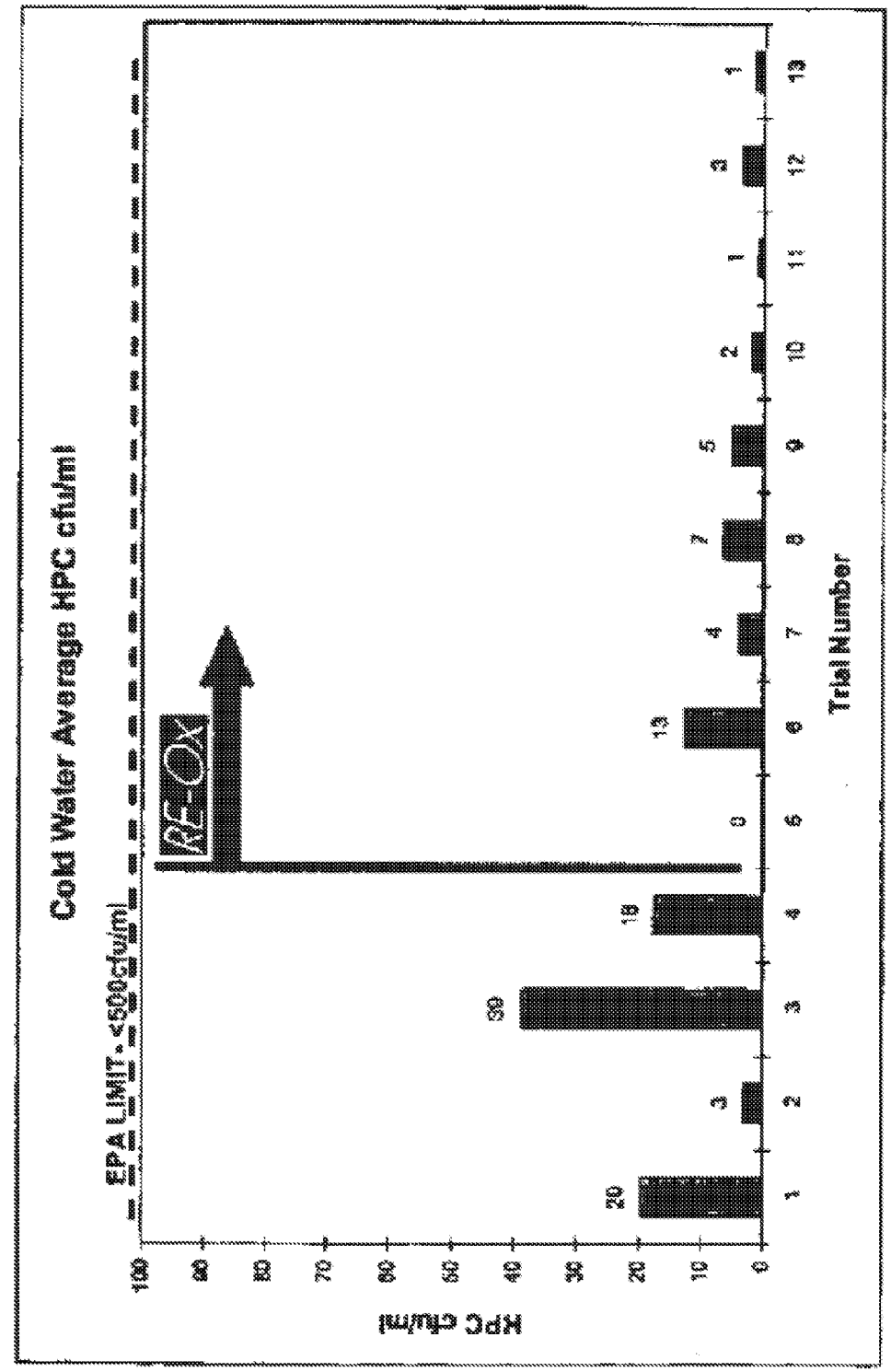
FIG. 21 is a bar chart showing cold water average heterotrophic bacteria count (cfu/ml) as a function of sampling period, with sampling periods 1 to 4 prior to treatment with RE-Ox®, and with sampling periods 5 to 13 after treatment with RE-Ox®.

Conclusions of the trial using Re-Ox® included:
Legionella bacteria was eliminated (see FIG. 15);
Corrosivity not a factor;
pH was not affected;
Volatile organic chemicals were not increased;
There was a slight increase in lead (see FIGS. 18-19);
Copper levels were suppressed in cold $H_2O$ (see FIGS. 16-17);
Trihalomethanes and haloacetic acids were within relative ranges; and
Heterotrophic bacteria were suppressed (see FIGS. 20-21).

Example 6

RE-Ox® Restores Chlorine Residuals in Chloraminated Systems

Biofilm burn-out occurred during the winter months in a water system. The objective was to restore chlorine residuals in the area of service. It was recommended that RE-Ox® be added in addition to the free chlorine provided by a Municipal Water District during the burn-out phase. Total chlorine was limited to 5 ppm during the burn-out period to eliminate bacterial deposits that had accumulated the previous year. These deposits were the precursors of higher levels of TTHM and HAA5s for DBPs. RE-Ox® was considered essential in this application for removing the nucleation sites that harbored the bacterial deposits.

Background:

The system obtains its water from two sources. In either case, the water received is chloraminated. To maintain residuals in its system, bulk sodium hypochlorite and liquid ammonium sulfate (LAS) are typically added.

During this burnout, pH and temperature were noted as well as TDS and conductivity levels. Total chlorine residuals were taken from 29 sampling points once a month. Data are provided in FIG. 22. There was a two week burn-out period. Only RE-Ox® was added during this burn-out phase.

After burnout, the level of RE-Ox® was reduced 1/20,000 gallons to 1/40,000 gallons. Total chlorine residuals were maintained at higher levels for two months. The use of bulk sodium hypochlorite and liquid ammonium sulfate (LAS) were suspended as long as Total Chlorine residuals were maintained.

RE-Ox Treatment:

The system uses approximately 6.6 gallons of RE-Ox® to 225,000 gpd, which is a dosing rate of 1/40,000 gallons. Test results were obtained by using Hach DPD colorimetric sampling method, and were verified through amperometric titration by the Municipal Water District laboratory. The findings show that the Total Chlorine residuals obtained by both methods were almost identical and confirmed that the distribution system Total Chlorine residuals have been restored to targeted levels after the application of RE-Ox®. Total Chlorine residuals remained level and elevated after the burn-out phase.

Conclusion:

The application of RE-Ox® during burnout with free chlorine, in combination with a subsequent maintenance close of RE-Ox® post burnout, resulted in the complete restoration of Total Chlorine residuals in the chloraminated distribution system.

Materials and Methods

Composition of RE-Ox®

RE-Ox® is 0.05% sodium hypochlorite in aqueous solution with a pH between 5 and 7.5. To produce RE-Ox®, water is activated by direct current in a specially designed electrolytic reactor that produces several oxidants. The exact composition of the resulting solution is not known because many of the oxidants are difficult or impossible to measure and/or are transient. The oxidant that is most stable and easiest to measure is sodium hypochlorite whose concentration in RE-Ox® is known.

Sodium Hypochlorite [CL] Trade Designation Product Function Max Use RE-Ox® Corrosion & Scale Control This product can be used at or up to 17,500 mg/L.

RE-Ox® is also effective in chloraminated systems.

The residual levels of chlorine (hypochlorite ion and hypochlorous acid), chlorine dioxide, chlorate ion, chloramine and disinfection by-products are monitored in the finished drinking water to ensure compliance to all applicable regulations.

Cleaning the System for RE-Ox® Production

The cleaning procedure for the hourly production cycle is as follows:

80 seconds of flushing with dilute brine
300 seconds of recirculating dilute hydrochloric acid
160 seconds of flushing with dilute brine
3060 seconds of production
cycle repeats.

Maintaining 7.0 pH is a delicate process, without this frequency of cleaning, 7.0 pH could not be obtained directly off the processors without chemical additions. This creates a major difference in the solution generated due to the fact that as the electrodes scale, the pH increases, the longer the synthesis running time, the greater the change in the product produced.

Tables 1-6 are embodied in FIGS. 23-28B.

The invention claimed is:

1. A method for reducing deposits in a water-containing system or apparatus utilizing an activated sodium hypochlorite solution comprising a plurality of different supplemental oxidants, the method comprising:

supplying said activated sodium hypochlorite solution comprising a plurality of different supplemental oxidants to a water-containing system or apparatus to yield a supplemental oxidant concentration of from 1 to 25 parts per billion in said water-containing system or apparatus.

2. A method according to claim 1, wherein the water-containing system or apparatus contains potable water.

3. A method according to claim 1, wherein the activated sodium hypochlorite solution comprising a plurality of different supplemental oxidants has a pH in a range of from about 5 to about 7.5.

4. A method according to claim 1, wherein said supplying of the activated sodium hypochlorite solution comprising a plurality of different supplemental oxidants to the water-containing system or apparatus is performed after water in said water-containing system or apparatus is disinfected with a primary disinfectant.

5. A method according to claim 4, further comprising supplying primary disinfectant to the water-containing system or apparatus, wherein the supplying of said activated sodium hypochlorite solution comprising a plurality of different supplemental oxidants to the water-containing system or apparatus is performed at the same facility as said supplying of primary disinfectant to the water-containing system or apparatus.

6. A method according to claim 1, further comprising storing said activated sodium hypochlorite solution comprising a plurality of different supplemental oxidants in at least one container, and transporting said at least one container to a treatment facility associated with said water-containing system or apparatus.

7. A method according to claim 1, wherein said activated sodium hypochlorite solution comprising a plurality of different supplemental oxidants is supplied to the water-containing system or apparatus to yield a supplemental oxidant concentration of from 1 to 12.5 parts per billion in said water-containing system or apparatus.

8. A method for reducing deposits in a water-containing system or apparatus, utilizing liquid comprising a plurality of different supplemental oxidants produced by flowing salt brine solution through at least a portion of at least one flow electrode module comprising an anode, a cathode, and an ion-permeable material arranged between the anode and the cathode, while electric power is applied between the anode and the cathode to electrolyze said salt brine solution, the method comprising:

supplying said liquid comprising a plurality of different supplemental oxidants to a water-containing system or apparatus to yield a supplemental oxidant concentration of from 1 to 25 parts per billion in said water-containing system or apparatus.

9. A method according to claim 8, wherein the at least one flow electrode module comprises a first passage between the anode and the ion-permeable material, and comprises a second passage between the cathode and the ion-permeable material.

10. A method according to claim 9, wherein the anode comprises a center anode, the ion-permeable material surrounds the center anode, the cathode comprises an outer cathode surrounding the ion-permeable material, the first passage comprises an inside passage, and the second passage comprises an outside passage.

11. A method according to claim 10, wherein at least a portion of the salt brine solution is flowed serially through the outside passage between the ion-permeable material and the outer cathode, and then through the inside passage between the ion-permeable material and the center anode.

12. A method according to claim 8, wherein the liquid comprising a plurality of different supplemental oxidants has a pH in a range of from about 5 to about 7.5.

13. A method according to claim 8, wherein said supplying of liquid comprising a plurality of different supplemental oxidants to the water-containing system or apparatus is performed after water in said water-containing system or apparatus is disinfected with a primary disinfectant.

14. A method according to claim 13, further comprising supplying primary disinfectant to the water-containing system or apparatus, wherein the supplying of said liquid comprising a plurality of different supplemental oxidants to the water-containing system or apparatus is performed at the same facility as said supplying of primary disinfectant to the water-containing system or apparatus.

15. A method according to claim 8, further comprising storing said liquid comprising a plurality of different supplemental oxidants in at least one container, and transporting said at least one container to a treatment facility associated with said water-containing system or apparatus.

16. A method according to claim 8, wherein said water-containing system or apparatus comprises at least a portion of a water distribution or water recirculation system.

17. A method according to claim 8, wherein the water-containing system or apparatus contains potable water.

18. A method according to claim 8, wherein said liquid comprising a plurality of different supplemental oxidants is supplied to the water-containing system or apparatus to yield a supplemental oxidant concentration of from 1 to 12.5 parts per billion in said water-containing system or apparatus.

19. A method according to claim 8, wherein the salt brine solution consists essentially of a sodium chloride solution, and said liquid comprising a plurality of different supplemental oxidants embodies an activated sodium hypochlorite solution comprising a plurality of different supplemental oxidants.

20. A method for reducing deposits in a water-containing system or apparatus utilizing an activated sodium hypochlorite solution comprising a plurality of different supplemental oxidants, the method comprising:
    storing said activated sodium hypochlorite solution comprising a plurality of different supplemental oxidants in at least one container, and transporting said at least one container to a treatment facility associated with said water-containing system or apparatus, and
    supplying said activated sodium hypochlorite solution comprising a plurality of different supplemental oxidants to a water-containing system or apparatus to yield a supplemental oxidant concentration of from 1 to 50 parts per billion in said water-containing system or apparatus.

21. A method for reducing deposits in a water-containing system or apparatus, utilizing liquid comprising a plurality of different supplemental oxidants produced by flowing salt brine solution through at least a portion of at least one flow electrode module comprising an anode, a cathode, and an ion-permeable material arranged between the anode and the cathode, while electric power is applied between the anode and the cathode to electrolyze said salt brine solution, the method comprising:
    storing said liquid comprising a plurality of different supplemental oxidants in at least one container, and transporting said at least one container to a treatment facility associated with said water-containing system or apparatus, and
    supplying said liquid comprising a plurality of different supplemental oxidants to a water containing system or apparatus to yield a supplemental oxidant concentration of from 1 to 50 parts per billion in said water-containing system or apparatus.

\* \* \* \* \*